(12) United States Patent
Gu et al.

(10) Patent No.: US 10,220,258 B2
(45) Date of Patent: Mar. 5, 2019

(54) METHOD AND DEVICE FOR PROVIDING WORKOUT GUIDE INFORMATION

(71) Applicant: Samsung Electronics Co., Ltd., Suwon-si, Gyeonggi-do (KR)

(72) Inventors: Heum Mo Gu, Anyang-si (KR); Geun Woo Kim, Gwangju (KR); Hyung Kim, Anyang-si (KR); Hee Seung Shin, Seoul (KR); Wan Sang Lee, Suwon-si (KR); Young Woon Chun, Seoul (KR); Kyung Sub Min, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/191,924

(22) Filed: Jun. 24, 2016

(65) Prior Publication Data
US 2016/0375306 A1    Dec. 29, 2016

(30) Foreign Application Priority Data
Jun. 26, 2015   (KR) ......................... 10-2015-0091285

(51) Int. Cl.
*A63B 24/00*     (2006.01)
*G01C 21/20*     (2006.01)
(Continued)

(52) U.S. Cl.
CPC ...... *A63B 24/0075* (2013.01); *A63B 24/0021* (2013.01); *G01C 21/20* (2013.01);
(Continued)

(58) Field of Classification Search
None
See application file for complete search history.

(56) References Cited

U.S. PATENT DOCUMENTS

| | | | |
|---|---|---|---|
| 7,254,516 B2 * | 8/2007 | Case, Jr. ................ | A63B 24/00 702/142 |
| 7,931,563 B2 | 4/2011 | Shaw et al. | |

(Continued)

FOREIGN PATENT DOCUMENTS

| | | |
|---|---|---|
| EP | 2508845 A1 | 10/2012 |
| JP | 2014-182063 A | 9/2014 |

(Continued)

OTHER PUBLICATIONS

"Pedal Dancer" Blog, titled, "Recommended Road Bike Rides Near Aspen", Jun. 24, 2014 www.pedaldancer.com/2014/06/recommended-road-bike-rides-near-aspen.html.*

*Primary Examiner* — Redhwan K Mawari
*Assistant Examiner* — Edward Torchinsky
(74) *Attorney, Agent, or Firm* — Jefferson IP Law, LLP

(57) ABSTRACT

A method and apparatus for providing workout guide information are provided. The apparatus includes a display, a memory configured to store workout route data including location data and elevation data, and a user profile, and a processor configured to determine at least one slope section through an analysis of the workout route data based on the user profile and output a map for displaying a workout route including the slope section to the display. The slope section in the workout route is configured to be displayed in a different form than a non-slope section. In addition, various embodiments identified throughout the specification are disclosed.

20 Claims, 25 Drawing Sheets

(51) Int. Cl.
*G01C 21/32* (2006.01)
*G01C 22/00* (2006.01)
*G01C 21/34* (2006.01)
*G01C 21/36* (2006.01)
*G01S 19/42* (2010.01)

(52) U.S. Cl.
CPC ........... *G01C 21/32* (2013.01); *G01C 21/343* (2013.01); *G01C 21/3673* (2013.01); *G01C 21/3676* (2013.01); *G01C 22/006* (2013.01); *G01S 19/42* (2013.01); *A63B 2024/0025* (2013.01); *A63B 2220/12* (2013.01); *A63B 2220/18* (2013.01); *A63B 2220/20* (2013.01); *A63B 2220/30* (2013.01); *A63B 2220/62* (2013.01)

(56) References Cited

U.S. PATENT DOCUMENTS

| | | | |
|---|---|---|---|
| 9,079,059 B2 * | 7/2015 | Cardoso, Jr. | A63B 24/0062 |
| 9,248,340 B2 | 2/2016 | Hoffman et al. | |
| 2006/0136173 A1 | 6/2006 | Case, Jr. et al. | |
| 2007/0287596 A1 | 12/2007 | Case, Jr. et al. | |
| 2008/0220941 A1 | 9/2008 | Shaw et al. | |
| 2009/0319230 A1 | 12/2009 | Case, Jr. et al. | |
| 2010/0088023 A1 * | 4/2010 | Werner | A63B 24/0021 |
| | | | 701/467 |
| 2010/0210421 A1 | 8/2010 | Case, Jr. et al. | |
| 2012/0078396 A1 | 3/2012 | Case, Jr. et al. | |
| 2012/0116550 A1 | 5/2012 | Hoffman et al. | |
| 2012/0143497 A1 | 6/2012 | Van Hende | |
| 2012/0239290 A1 | 9/2012 | Fujita | |
| 2014/0228986 A1 | 8/2014 | Case, Jr. et al. | |
| 2014/0228987 A1 | 8/2014 | Case, Jr. et al. | |
| 2014/0228988 A1 | 8/2014 | Hoffman et al. | |
| 2014/0330409 A1 | 11/2014 | Case, Jr. et al. | |
| 2015/0081210 A1 * | 3/2015 | Yeh | A61B 5/7415 |
| | | | 701/428 |
| 2015/0251053 A1 | 9/2015 | Hoffman et al. | |
| 2015/0258380 A1 | 9/2015 | Hoffman et al. | |
| 2016/0107064 A1 | 4/2016 | Hoffman et al. | |
| 2016/0121163 A1 | 5/2016 | Case, Jr. et al. | |
| 2016/0375306 A1 * | 12/2016 | Gu | A63B 24/0021 |
| | | | 701/430 |

FOREIGN PATENT DOCUMENTS

| | | |
|---|---|---|
| KR | 10-2009-0004252 A | 1/2009 |
| KR | 10-1034646 B1 | 5/2011 |
| KR | 101381380 B1 | 4/2014 |
| KR | 10-2015-0008534 A | 1/2015 |
| KR | 20150067992 A | 6/2015 |
| WO | 2006065679 A2 | 6/2006 |

* cited by examiner

| SLOPE(A-B) | p1 | p2 | p3 | p4 | p5 | p6 | p7 | p8 | p9 | p10 | p11 | p12 | p13 | p14 |
|---|---|---|---|---|---|---|---|---|---|---|---|---|---|---|
| GROUP 1 (SLOPE) | ↑ | ↑ | ↑ | | | ↑ | ↑ | ↑ | ↓ | | | | ↓ | ↓ |
| GROUP 2 (FLATLAND) | | | | ↑ | ↑ | | | | | ↓ | ↓ | ↓ | | |
| SLOPE SECTION | ↑ | ↑ | ↑ | ↑ | ↑ | ↑ | ↑ | ↑ | ↓ | ↓ | ↓ | ↓ | ↓ | ↓ |

FIG.6C

METHOD AND DEVICE FOR PROVIDING WORKOUT GUIDE INFORMATION

CROSS-REFERENCE TO RELATED APPLICATION(S)

This application claims the benefit under 35 U.S.C. § 119(a) of a Korean patent application filed on Jun. 26, 2015 in the Korean intellectual Property Office and assigned Serial number 10-2015-0091285, the entire disclosure of which is hereby incorporated by reference.

TECHNICAL FIELD

The present disclosure relates to a technique for analyzing a workout route or a workout record and providing a user customized workout route and workout guide.

BACKGROUND

As functions of smartphones, wearable devices, and electronic devices mountable on vehicles or bikes (including bicycles) become diversified, services for recording and assisting users' workouts are being provided. For example, electronic devices may collect users' workout records through global positioning system (GPS) or various sensors. Additionally, health applications provided from electronic devices may provide functions for recording and sharing users workouts.

Workout applications/services provided from existing electronic devices provide route (or GPS) information, time information, and so on. For example, when a user records a bike workout, a workout time, a traveling distance, and an average speed may be provided. When elevation information is provided, the height information of a specific geographic position may be provided or the average slope information of an entire route may be provided. For example, a value obtained by dividing a difference between an elevation at an arrival point and an elevation at a start point by a straight route between two points may be provided as elevation information.

In such ways, existing workout related services may provide only basic analysis information such as a workout time, an elevation gain, and an average speed, in relation to an analysis of a workout route or a workout record. However, through such information, it is difficult to know that this workout route is an appropriately matching workout route compared to a user's body conditions or workout abilities (for example, whether it is a too easy or difficult section for a user). For example, if there is an 11-degree slope uphill section in some of a workout route, it is difficult for a general cycle rider to pass this uphill section. However, in existing workout related services, it is difficult for a user to identify such section information easily.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for generating information such as a section specific slope, a difficulty, a highlight section, an uphill section, and a downhill section of a corresponding route by using data of a route where others work out or a user works out. Additionally, as this information is utilized together with personal workout information such as a user profile, user customized workout information may be provided and meaningful workout guide may be provided.

In accordance with an aspect of the present disclosure, an electronic device is provided. The electronic device includes, a display, a memory configured to store workout route data including location data and elevation data, and a user profile, and a processor configured to determine at least one slope section through an analysis of the workout route data based on the user profile and output a map for displaying a workout route including the slope section to the display. The slope section in the workout route is configured to be displayed in a different form than a non-slope section.

In accordance with another aspect of the present disclosure, a workout guide method of an electronic device is provided. The workout guide method includes, obtaining workout route data including location data and elevation data, and a user profile, determining at least one slope section through an analysis of the workout route data based on the user profile, and outputting a map for displaying a workout route including the at least one slope section to the display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A to 6D are views illustrating a method of determining a slope section according to various embodiments of the present disclosure;

Throughout the drawings, like reference numerals will be understood to refer to like parts, components, and structures.

DETAILED DESCRIPTION

Figure 1:
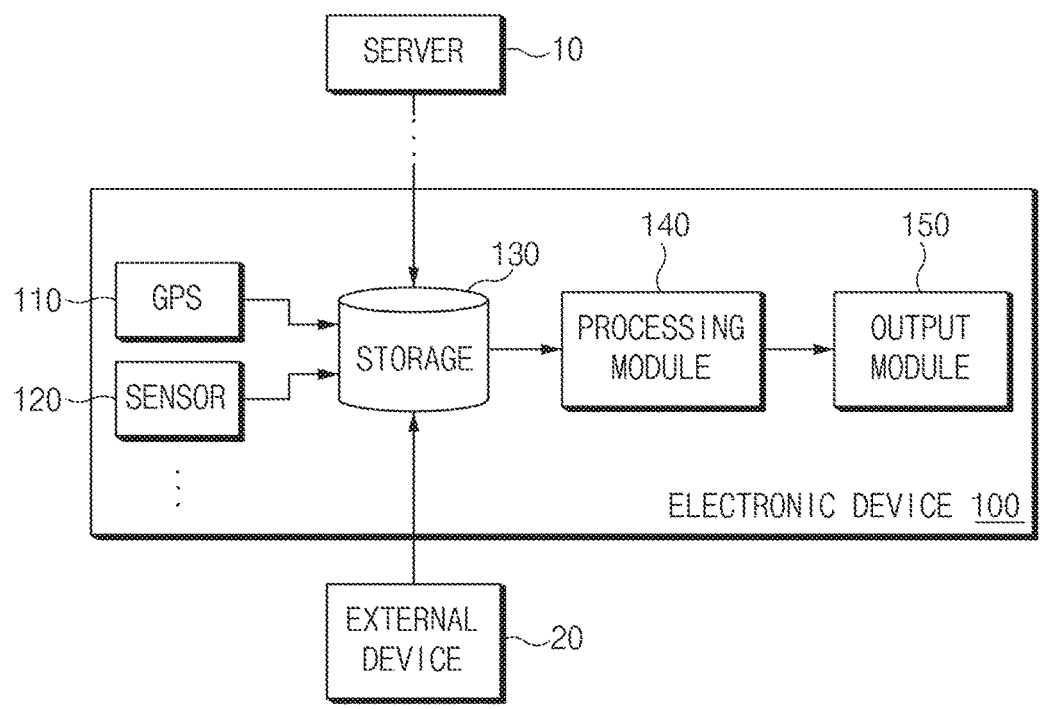
FIG. 1 is a view illustrating a system for storing and processing route data according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second" and the like used second, herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor for example, a central processing unit (CPU) or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), moving picture experts group layer-3 audio players (MP3s), mobile medical devices, cameras, and wearable devices. According to various embodiments of the present disclosure, the wearable devices may include at least one of accessory types (e.g., watches, rings, bracelets, anklets, necklaces, glasses, contact lenses, or head-mounted-devices (HMDs)), fabric or garment integrated types (for example, e-apparel), body-mounted types (for example, skin pads or tattoos), or bio-implantation types (for example, implantable circuits).

According to some embodiments of the present disclosure, an electronic device may be home appliance. The smart home appliances may include at least one of for example, televisions, digital video/versatile disk (DVD) players, audios, refrigerators, air conditioners, cleaners, ovens, microwave ovens, washing machines, air cleaners, set-top boxes, home automation control panels, security control panels, television (TV) boxes (e.g., Samsung HomeSync™, Apple TV™ or Google TV™), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global navigation satellite system (GNSS), event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

Various embodiments disclosed in this specification may provide workout routes of other people, workout coaches, or athletes to a user in appropriate forms in addition to providing workout log services for recording and storing workouts that a user performs by using an electronic device. For example, an electronic device may provide a guide for allowing a user not to get out of a route or to progress on a route efficiently in order for the user to achieve a workout target by providing whether a workout route that a user selects is appropriate for the user or a section specific feature of a workout route before workout and providing a notification at the effective timing. In general, "workout" in this specification means an executable workout while a user moves on a route, for example, running, cycling, walking, mountaineering, and biking. Hereinafter, with reference to FIGS. 1 and 2, the concept and operation scenario of an entire system are described.

FIG. 1 is a view illustrating a system for storing and processing route data according to an embodiment of the present disclosure.

Referring to FIG. 1, a user runs in an execution state of a health application of the electronic device 100, user's location information may be collected continuously by using a GPS 110. Additionally, user's elevation information by a sensor 120 for measuring elevation such as a barometer may be collected together with location information. Although not shown in the drawing, the electronic device 100 may include various sensors/modules for collecting workout related information or records in addition to the GPS 110 or the sensor 120 (for example, an elevation sensor). For example, the electronic device 100 may measure a time consumed for moving on a user's specific route, a workout start time, and a workout end time by using a timer.

Workout records, as one type of workout route data, may be stored in a storage 130. In the example above, workout records generated by the electronic device 100 itself are stored in the storage 130. Workout records may be stored in a structured document format. For example, workout records may be stored in the GPS exchange (GPX) format that is one kind of extensible markup language (XML) scheme. The GPX format, for example, may include information on routes, waypoints, and tracks. The GPX format may further include additional information. For example, the GPX format for cycle workout may further include wheel rpm information.

In an embodiment disclosed in this specification, a structured document for expressing GPS information may have formats such as keyhole markup language (KML), coordinate reference system (CRS), and training center XML (TCX) in addition to GPX. In the description below, it may be understood that a GPX file refers to a structured document where workout route data is stored. Especially, such a structured document may have elevation, tune, and other geographical information at each point in addition to latitude and longitude coordinates, and may define and/or include additional information for supporting each format. Herein, the geographical information may include elevation data, slope data, a road type (for example, a paved/unpaved road), and a road state (for example, a (weather information based) wet or dry state)).

According to an embodiment of the present disclosure, workout records or workout route data may be downloaded from a server 10. For example, a user of the electronic device 100 may download a desired course or a desired level of workout records by accessing the server 10 that provides other people's workout records. According to an embodiment of the present disclosure, the electronic device 100 may upload user's workout records to the server 10.

Workout records or workout route data may be obtained from an external device 20. For example, the electronic device 100 may be connected to the external device 200 via network (for example, Bluetooth (BT), near field communication (NFC), wireless fidelity (Wi-Fi), Wi-Fi Direct, Bluetooth Low Energy (BLE), ANT, ANT+, or wired network such as data bus. The external device 20, for example, may correspond to an electronic device for recording a workout state according to a user's workout as being attached to a wearable device such as a user-wearable smart watch or smart glass or a user's workout apparatus (for example, a bicycle or bike, a car, a ski, and so on).

Workout records or workout route data may be obtained from at least one device and combined. For example, the electronic device 100 may obtain location information (for example, latitude and longitude) and elevation information by using the GPS 110 and the sensor 120. Additionally, user's biometric information (for example, heart rate may be obtained from the external device 20 at a location on a route. In this case, the external device 20 may be equipped with a biometric sensor corresponding to biometric information to be obtained.

In addition to workout route data, user profile information may be stored in the storage 130. The user profile information may include information necessary for analyzing workout route data and providing workout guide, for example, user's body conditions (for example, height, weight, age, and so on), user's workout careers, or workout levels.

The storage 130 may correspond to a memory. The storage 130, for example, may correspond to various types of internal memories or external memories, which are included in or connected to the electronic device 100. Specific examples of the storage 130 are described later.

A processing module 140 may determine a guide to be provided by analyzing workout route data stored in the storage 130 or analyzing workout state information collected (sensed) in real time. The processing module 140 may correspond to a processor responsible for an overall control of the electronic device 100. Additionally, in one embodiment of the present disclosure, the processing module 140 may be implemented with an additional processor (or hardware module) or a software module, which is responsible for the workout route analysis and/or workout guide provision.

The output module 150 may correspond to hardware for outputting a performance result of the processing module 140. For example, an analysis result on a user profile and workout route data may be outputted to a display. Additionally, when a workout program is performed, the processing module 140 may provide a guide through a display screen or a sound using a speaker according to a user's location or workout state. The display or the speaker may correspond to one example of the output module 150.

The system shown in FIG. 1 may have various configurations and may be modified in an appropriate form according to the type of workout or a user device. For example, some components may be added to or deleted from the electronic device 100. Alternatively, according to an embodiment of the present disclosure, some configurations, which are shown in FIG. 1 as components of the electronic device 100, may be replaced with an external device (for example, a wearable device, a configuration of a linked workout apparatus, and so on) disposed outside the electronic device 100. For example, the electronic device 100 may deliver a performance result of the processing module 140 to a wearable device linked to the electronic device 100, and a wearable device (for example, a smart watch, a smart glass, and so on) may provide a user feedback or a workout guide. Other configurations are described with reference to other drawings.

Figure 2:
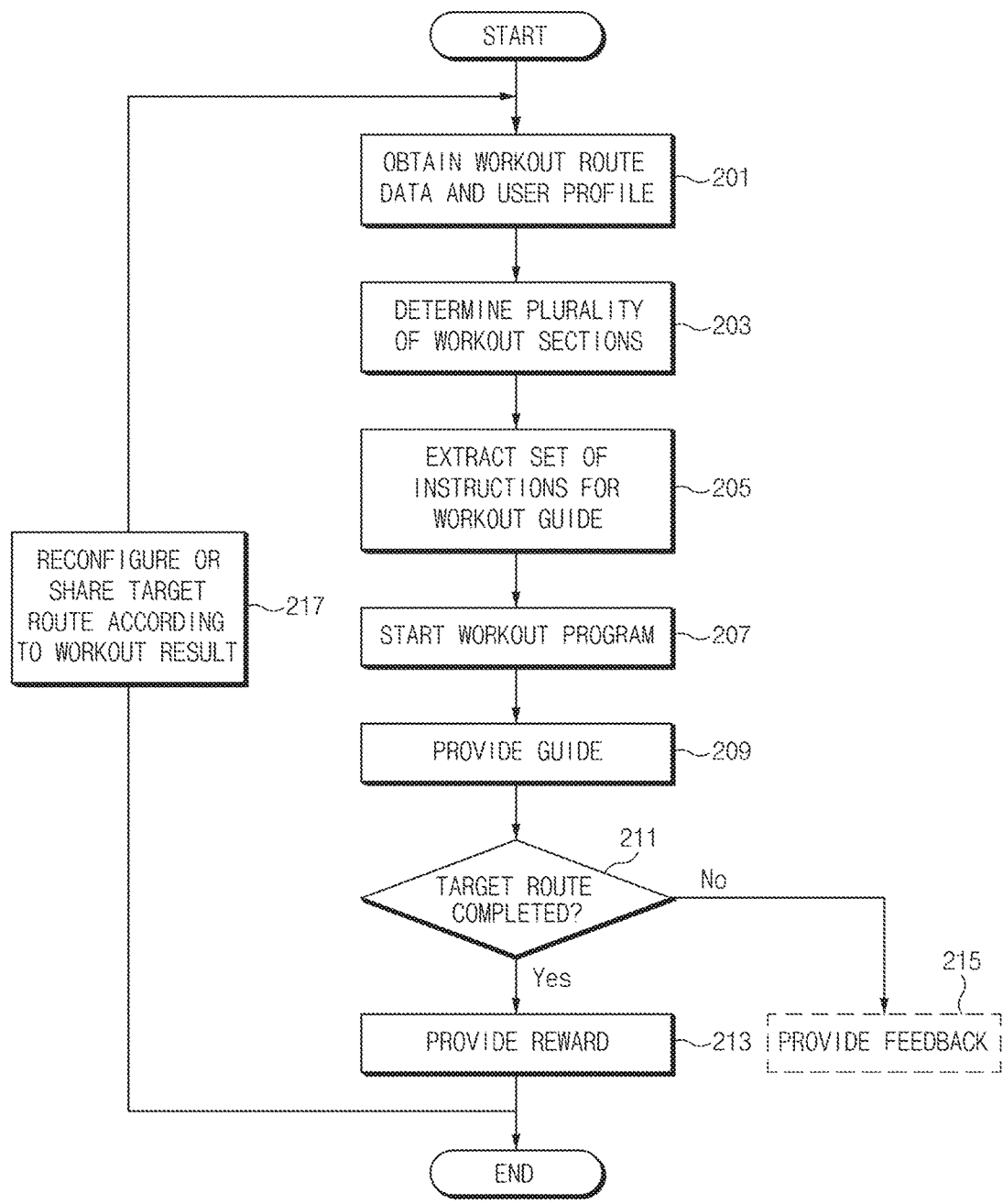
FIG. 2 is a flowchart for a route analysis and workout guide provision according to an embodiment of the present disclosure.

FIG. 2 is a flowchart for a route analysis and workout guide provision according to an embodiment of the present disclosure.

In operation 201, the electronic device 100 may obtain workout route data and a user profile. As mentioned above, the workout route data and the user profile may be generated by the electronic device 100 itself or may be obtained from the server 10 or another external device 20.

In operation 203, the electronic device 100 may determine a plurality of workout sections based on the workout route data and the user profile. For example, the electronic device 100 may check a workout route by using location data and elevation data included in the workout route data. In general, the electronic device 100 may determine a workout route only with location data. Workout route data may include elevation data corresponding to each location, and the electronic device 100 may determine various types of workout sections based on a change in the elevation data. For example, it may be determined that a section where elevation rises continuously along a route is an uphill section, and a section where elevation drops continuously is a downhill section, and a section where there is no meaningful change in elevation is a flat section. Additionally, despite of the same uphill or downhill section, the electronic device 100 may configure different uphill sections based on the size of a change. For example, when considering a change in elevation, a section having an average 1 to 2-degree slope (for example, elevation rises about 1 m to about 2 m when moving 100 m) may be configured as a level 1 uphill section, and a section having an average 3 to 4-degree slope may be configured as a level 2 uphill section.

In an embodiment disclosed in this specification, a user profile may include user's previous workout records. Additionally, workout records may include user's body information and biometric information obtained in relation to workout routes. For example, workout records may include records such as users' ages, weights, fatigues, blood pressures, heart rates, and electrocardiograms, and each workout record is divided by each section included in a workout route and recorded in real time, Workout records may be used to provide pace adjustment when a user works out a similar or same route (section) or a feedback such as warning of physical danger.

In operation 203, the electronic device 100 may differently determine the property of a workout route based on a user profile. For example, when a user has an intermediate proficiency in a cycle event, that is, when a user's workout level is recorded as an intermediate level in a user profile, the level 1 uphill section may be guided as a flat section. That is, the electronic device 100 may analyze a workout route by referring to location data and elevation data, and a user profile, and determine a feature of a plurality of workout sections included in the workout route.

In operation 205, the electronic device 100 may extract a set of commands or instructions for real-time workout guide. The set of commands may include information on a guide for a workout route, a guide provided before entering a specific workout section, a guide provided when leaving a workout route, and/or a guide for a workout state detected in a specific workout section.

In operation 207, a workout program may start. Herein, the workout program may be one among several workout programs selectable by a user. Once the workout program starts, the electronic device 100 may check a user's workout state by collecting the current location and elevation, speed, and biometric information of a user (that is, via an electronic device.

In operation 209, the electronic device 100 may provide a guide for a workout route, According to an embodiment of the present disclosure, when a user enters a workout route or a specific target section, the electronic device 100 may notify that the workout route or the specific target section (for example, a target route) starts before entering. For example, the electronic device 100 may provide a notification "1.6 km uphill section starts soon. Target passing time is 5 min" through a display and/or a speaker.

In operation 211, the electronic device 100 may determine whether the target route is completed. If the target route is completed, for example, when a user completes the 1.6 km uphill section in 5 min, in operation 213, the electronic device 100 may provide a screen or a comment for notifying reward or target accomplishment. If the target route is not completed, for example, when a user does not complete the 1.6 km uphill section or exceeds a time, in operation 215, the electronic device 100 may provide failure related feedback.

Through the above process, a workout route guide operation may be terminated. A workout record that a user performs may be used to reconfigure a target route or to be shared with another user in operation 217. For example, in a case that a workout program is performed by selecting workout route data that another user or a user completes a 30 km workout route in 40 min before, if a user updates the record by completing the workout route in 38 min, the user's record is uploaded to the server 10 to be shared with another user, update a user profile (for example, update user's workout ability information from a beginner to an intermediate), or be used for user's next target setting (for example, 37 min completion).

A configuration and operation scenario according to an embodiment of the present disclosure are described above. Hereinafter, an embodiment for analyzing workout route data and an embodiment for providing workout guide are described.

Figure 3:
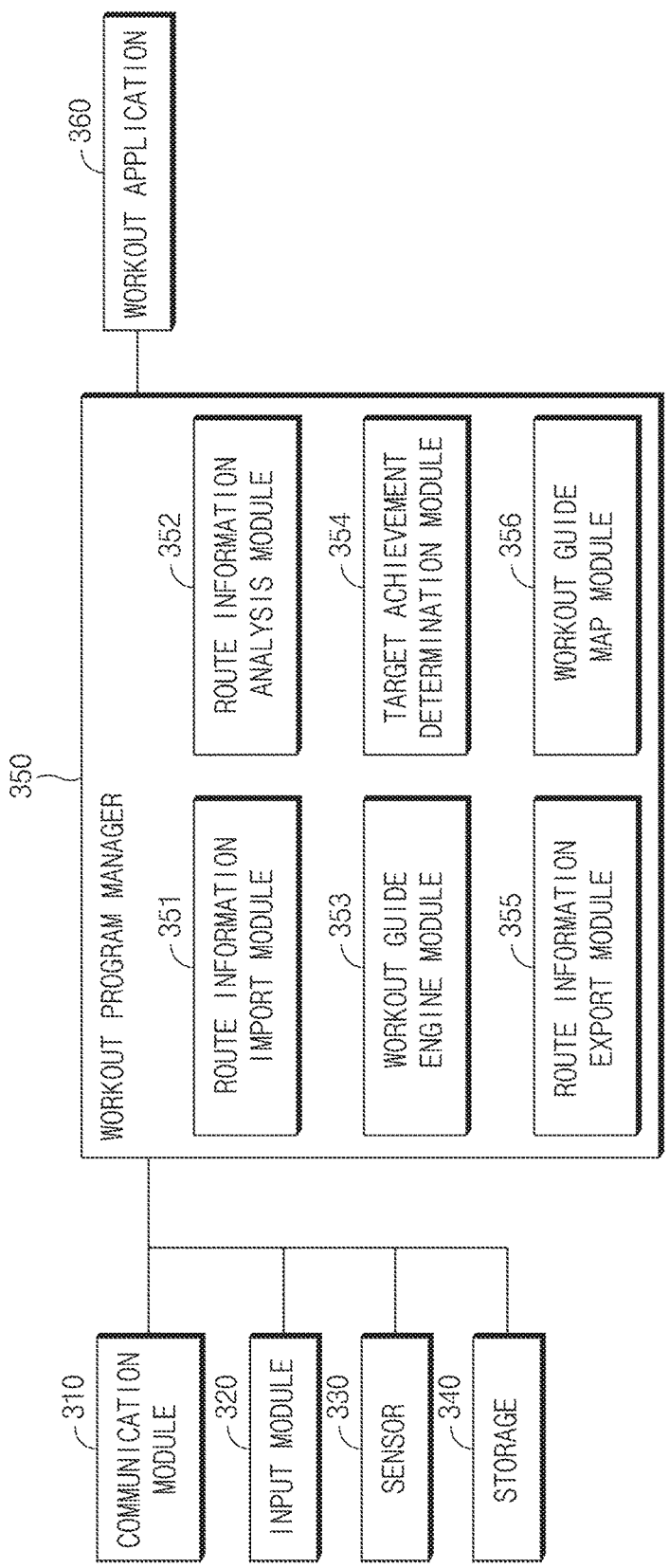
FIG. 3 is a block diagram illustrating a configuration of an electronic device according to an embodiment of the present disclosure.

FIG. 3 is a block diagram illustrating a configuration of an electronic device according to an embodiment of the present disclosure.

Referring to FIG. 3, the configuration of the electronic device may correspond to another example of the configurations of the electronic device 100 of FIG. 1. In more detail, the GPS 110 may configure part of a communication module 310, and the sensor 120 and the storage 130 may correspond to a sensor 330 and a storage 340, respectively. The GPS 110 may be classified as the sensor 330 in the sense of detecting the location of the electronic device 100. As described below, some components shown in FIG. 3 may be components disposed outside the electronic device 100. The configuration shown in FIG. 3 illustrates a configuration for implementing an embodiment disclosed in this specification and all these configurations are not necessarily implemented in one electronic device. The electronic device 100 may request data or data processing from an external device and receive data or the processing result by using the communication module 310.

Hereinafter, a configuration and operation of an electronic device are described with reference to FIGS. 3 to 5.

The communication module 310 may receive data for user's workout state analysis in a workout program manager 350 from the server 10 or the external device 200. According to an embodiment of the present disclosure, the communication module 310 may perform an operation for connecting to an external device in order to perform workout program (or guide) creation. The communication module 310 may include a communication interface and an antenna in order to use a communication method such as 2G/3G, LTE, NFC, and Bluetooth (BT). Specific examples of the communication module 310 are described as a communication interface 1470 or a communication module 1520 in FIGS. 14 and 15.

An input module 320 may correspond to a device for receiving various forms of inputs such as user's sound, touch input, and image in an electronic device. For example, the input module 320 may correspond to a component such as a microphone, a camera, a touch display, a physical keyboard, or a key button. Additionally, the input module 320 may correspond to an external input device (for example, a Bluetooth (BT) keyboard) that is connected by wire or wirelessly connected to an electronic device. An input occurring through the input module 320 may be received through the communication module 310 and delivered to a processing module 140 (for example, a processor) of the electronic device 100.

The sensor 330 may correspond to at least one sensor for measuring user-related health state information or biometric information and movement position information of a user (that is, via a user's electronic device).

The electronic device 100 may utilize information detected by the sensor 330 in order to store a workout route or a workout record. For example, in order to store a workout route, a GPS sensor, a barometer, a gyro sensor, and an acceleration sensor may be utilized. The GPS sensor may obtain the current location (for example, latitude and longitude) and elevation information of the electronic device 100 by using signals transmitted from satellites. In order to improve the accuracy of elevation information obtained through the GPS sensor, the electronic device 100 may utilize a pressure sensor. The electronic device 100 may check a direction that a user of the current electronic device 100 moves on a map or a direction that a user sees through a gyro sensor. The electronic device 100 may measure a speed at which the current electronic device 100 (or a user) moves by using an acceleration sensor, and use information obtained by an acceleration sensor in order to measure an accurate workout speed together with information obtained through a GPS sensor. By utilizing information detected through such a sensor, the electronic device 100 may identify user's current workout time, distance, speed, elevation, and location. The identified information may be utilized to obtain the maximum speed, an average speed, a calorie consumption amount, an average/maximum pace, the maximum elevation, an elevation gain, a total uphill section, and a total downhill section.

The sensor 330, for example, is attached to various workout devices such as a bike (bicycle), a treadmill, a spin bike, a pumping board, and so on, so that information sensed by each workout device may be provided to the electronic device 100, For example, while bicycle riding, the bicycle (bike) may include various sensors. For example, a cadence, a speed meter, and a power meter may be included in a bike as an example of the sensor 330. Such sensors may store information occurring from a workout device and this information may be valuably used for relatively accurate workout guide or workout record. For example, in the case of a speed meter, by utilizing wheel information (for example, the diameter of a wheel), a more accurate distance value may be measured compared to a GPS based distance measurement. Additionally, like providing a balanced riding method through a cadence or providing muscle enhancement information through a power meter, a variety of information may be provided or analyzed during workout or after workout.

A sensor for measuring user's health state information or biometric information, for example, may be one of a pedometer, a blood pressure gauge, a glucose meter, photoplethysmography (PPG), electrocardiography (ECG), electromyography (EMG), electroencephalography (EEG), an oxygen saturation measurement sensor, a skin level measurement sensor, an obesity gauge, and a temperature sensor. A sensor for recognizing a user's individual biometric feature, for example, may be one of a fingerprint sensor, an iris recognition sensor, a face recognizer, a hand shape recognizer, a hand vein recognizer, a speech recognizer, and a handwriting signature recognizer. In addition, a camera, an infrared OR) camera, a touch sensor, or a microphone may correspond to the sensor 330.

A health sensor for obtaining such biometric information (hereinafter referred to as a "health sensor) may collect at least one biometric signal from a user. The health sensor, for example, may collect data for measuring at least one of user's blood pressure, blood flow, heart rate (HRM and HRV), body temperature, respiratory rate, oxygen saturation, lung sound, glucose, waist circumference, height, weight, body fat, calorie consumption amount, EEG, voice, skin resistance, EMG, ECG, gait, ultrasound imaging, sleep state, expression (face), dilated pupils, and eye blinking. The processing module 140 may extract biometric feature information by analyzing the collected biometric information. For example, the processing module 140 may obtain primary biometric feature information such as an average heart rate or heart rate distribution by analyzing pulse wave signals obtained through a heart rate variability (HRV) sensor. Additionally, the processing module 140 may obtain secondary biometric feature information such as stress conditions and vascular aging by processing the obtained biometric signal (or information).

The health sensor may output the collected user biometric signal to the sensor outside (or the output module 150) simply, and analyze the biometric signal by using a processor embedded in the health sensor and output biometric feature information. Accordingly, biometric signals collected through the health sensor may be delivered to a self processor coupled to a sensor or a processor (for example, the processing module 140) disposed at the sensor outside and embedded in the electronic device 100 and used for generating biometric feature information. For example, biometric signals collected through a mobile phone (for example, a smartphone) including an ECG sensor embedded) or a wrist watch (for example, a smart watch) including a PPG sensor embedded may be used for generating biometric feature information.

According to an embodiment of the present disclosure, biometric information collected by an HRV sensor embedded in an ear clip may be delivered to an electronic device such as a smart watch or a smartphone, and the electronic device that receives this biometric information may extract biometric feature information. The extracted information may be utilized in a device that extracts the information or may be delivered to at least one another device. If a smartphone extracts biometric feature information, a smart watch, which receives this information from the smartphone, may provide biometric feature information to a user through a display and also an ear clip that receives this information provides it to the user through sound (or voice).

In addition, the sensor 330 may mean or include a key input detection sensor, an impact detection sensor, a vibration detection sensor, and a sensor for detecting a connection of a wired/wireless device.

One sensor may detect two or more information. For example, an acceleration sensor may measure a user's motion and the number of user's steps at the same time. In another example, a PPG sensor may measure biometric information such as heart rate and stress, and may be utilized as a proximity sensor based on received photos at the same time. In another example, an ECG sensor may recognize emotion, heart rate, and HRV through a user's ECG analysis, and may be utilized for the purpose of authenticating a user.

According to an embodiment of the present disclosure, when the power of the electronic device 100 is ON, the sensor 330 may be driven at all times. Alternatively, the sensor 330 may be driven according to a user's input (for example, a key input, a button input, a graphic user interface (GUI) input, a gesture recognition, and so on). Alternatively, when one sensor operates, another sensor relating to this may be driven automatically.

According to an embodiment of the present disclosure, the sensor 330 may be built in the electronic device 100 but a part of a sensor may be disposed outside the electronic device 100 or may correspond to an external device for sensing or may be installed in an external environment (for example, indoors, outdoors, buildings, base stations, and so on).

The storage 340 (or memory) may store state information on a user of the electronic device 100. Besides, the storage 340 may store a user's workout record and a workout record of another user received from the server 10. Additionally, according to an embodiment of the present disclosure, the storage 340 or some data storable in the storage 340 may be disposed in a server or cloud connectable through the communication module 310.

The storage 340 may correspond to one type of memory. The storage 340 may store instructions (for example, program code) for implementing or driving various modules, managers, and engines. Besides, the storage 340 may store applications, images, or map data. In relation to various data stored in the storage 340, it is described with reference to a memory 1430 in FIG. 14.

An electronic device shown in FIG. 3 may include a workout program manager 350. The workout program manager 350 may be responsible for a role of providing a guide for situation by analyzing a user's workout state. The workout program manager may be divided into a workout program guide module and a workout route target guide module. The workout program guide module may provide an overall workout target (for example, a target pace, a target distance, a target duration time, a target calorie, and so on) and provide a function for determining whether it is achieved. When configuring a workout target by utilizing a user's own previous workout route(s) and other's workout route(s) in order for the workout program guide, the workout route target guide module may perform a function of analyzing a target route and generating an interaction appropriate for a user's workout based on a user's profile. Since embodiments in this specification mainly relate to a workout route target guide module, description for FIG. 3 and below is made based on a configuration of a workout route target guide module.

The workout program manager 350 (for example, a route target guide module) may include a route information import module 351, a route information analysis module 352, a workout guide engine module 353, a target achievement determination module 354, a route information export module 355, and a workout guide map module 356.

The route information import module 351 may import a target route from workout route data such as GPX file. Additionally, the route information import module 351 may determine whether route information included in workout route data is appropriate to be used as a workout route. For example, when a user wants to do a cycle workout, if there is a motorway in a route, it is determined that the route is not appropriate to be used as a workout route. Additionally, the route information import module 351 may generate a workout location by utilizing geo code information.

The route information analysis module 352 may perform a function for analyzing and extracting various data necessary for a workout guide or coaching, a function for viewing basic information (for example, an elevation gain, an average slope, and so on), a function for extracting uphill or downhill information by utilizing continuous elevation information, and a function for estimating whether a workout route with respect to user's workout capability is appropriate based on difficulty and user profile. In relation to an operation of the route information analysis module 352, it is described in more detail with reference to FIG. 4.

When a user selects an arbitrary workout program and starts a workout, the workout guide engine module 353 may perform a function for providing a workout related guide to the user. For example, the workout guide engine module 353 may perform a function for determining the start of a route, completion, route deviation, re-entry, and traveling direction and providing a notification to a user. In relation to an operation of the workout guide engine module 353, it is described in more detail with reference to FIG. 5.

The target achievement determination module 354 may determine an achievement ratio of instructions provided to a user and route deviation or whether a target is achieved, and based on a determination result, provide reward or feedback.

The route information export module 355 may perform an export function for storing or sharing a user's workout performance record. Additionally, the route information export module 355 may perform a function for adding a target route or a target section with respect to a route or a section, which is determined as meaningful.

The workout guide map module 356 may perform a function for displaying user's start location, current location, target route, progressing route, and progressing direction on a map. For this, the workout guide map module 356 may utilize various information collected by the sensor 330.

The workout application 360 may perform a function for outputting workout information in interaction with a user and receiving a user input based on information provided from the workout program manager 350. According to an embodiment of the present disclosure, the workout program manager 350 may be implemented in the workout application 360. According to another embodiment of the present disclosure, the workout application 360 may be a plurality of applications, and the workout program manager 350 may provide information appropriate for each application.

Figure 4:
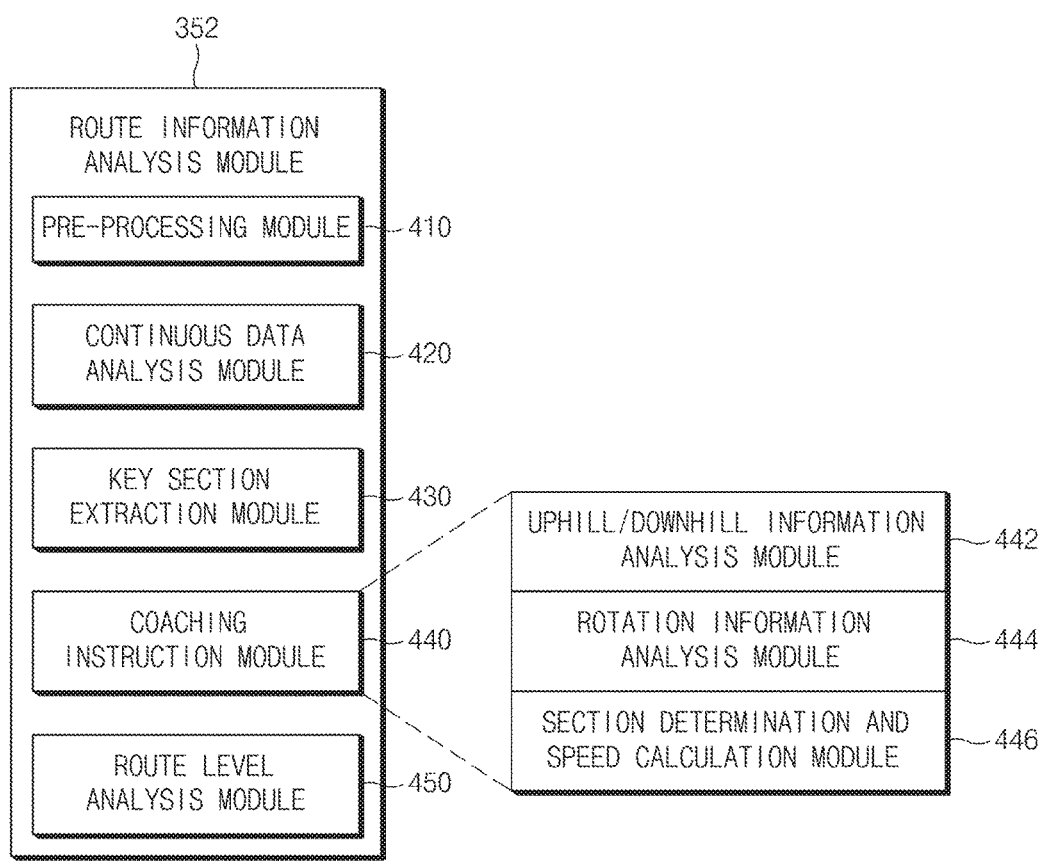
FIG. 4 is a view illustrating a configuration of a route information analysis module according to an embodiment of the present disclosure.

FIG. 4 is a view illustrating a configuration of a route information analysis module according to an embodiment of the present disclosure.

The route information analysis module 352 may include various sub modules. For example, a pre-processing module 410, a continuous data analysis module 420, a key section extraction module 430, a coaching instruction extraction module 440, and a route level analysis module 450.

The pre-processing module 410 may extract time, location, start point, end point, and elevation information from data included in initial raw data, for example, data included in GPX file. For example, the pre-processing module 410 may extract a workout start point, a workout end point, GPS location information of a traveling region, elevation information at each location, and workout time (or record) information (for example, workout start time and workout end time) from a GPX file in which a workout record performed by a professional cyclist is stored. In addition, when workout route data (for example, GPX file) includes additional or extension information, the pre-processing module 410 may extract corresponding addition or extension information.

The continuous data analysis module 420 may analyze processed information such as elevation gain, duration time, traveling distance, and average slope based on information pre-processed by the pre-processing module 410. For example, the continuous data analysis module 420 may obtain workout continuous time information from workout start time and workout end time information. Additionally, the continuous data analysis module 420 may obtain the sum (or elevation gain) of heights in the total uphill sections that a user moves by analyzing elevation information. Additionally, the continuous data analysis module 420 may obtain a performed workout route by using each GPS location information.

The key section extraction module 430 may determine an uphill section, a downhill section, and a highlight section by checking a continuous pattern of a slope. For example, a workout route may be divided into ten (10) sections based on a change in slope. For example, the entire workout route may include a first section (flatland), a second section (uphill), a third section (flatland), a fourth section (downhill), a fifth section (uphill), a sixth section (uphill/steep slope), a seventh section (flatland), an eighth section (downhill), a ninth section (flatland), and a tenth section (downhill). In the above example, the flat section may correspond to a section having a −1 to 1 degree slope; the uphill section may correspond to a section having a 1 to 3 degree slope; and the downhill section may correspond to a section having a slope of less than −1 degree. Additionally, the sixth uphill section may correspond to a section having a slope of more than 3 degrees. Such settings may be modified in various forms. Additionally, even when the same route is analyzed, another analysis result may be derived according to a user profile. For example, if a user's workout level is an entry level (or beginner), the route information analysis module 352 may analyze a 1 to 2 degree slope as a first level of uphill section and a 2 to 4 degree slope as a second level of uphill section, and if an uphill section that exceeds 4 degrees is included in a workout route, notify a user that a corresponding workout route is hard at the current time point. However, if a user's workout level is an advanced level (or professional), the route information analysis module 352 may determine a slope of less than 2 degrees as a flat section and analyze a 2 to 5 degree slope as a first uphill section, a 5 to 8 degree slope as a second uphill section, and an 8 to 11 degree slope as a third uphill section.

Additionally, in the above example, the key section extraction module 430 may determine a highlight section according to a specified condition. For example, the key section extraction module 430 may determine a section where it is expected that calorie consumption is the highest as a highlight section based on an elevation change in section and the length of a section.

Figure 8:
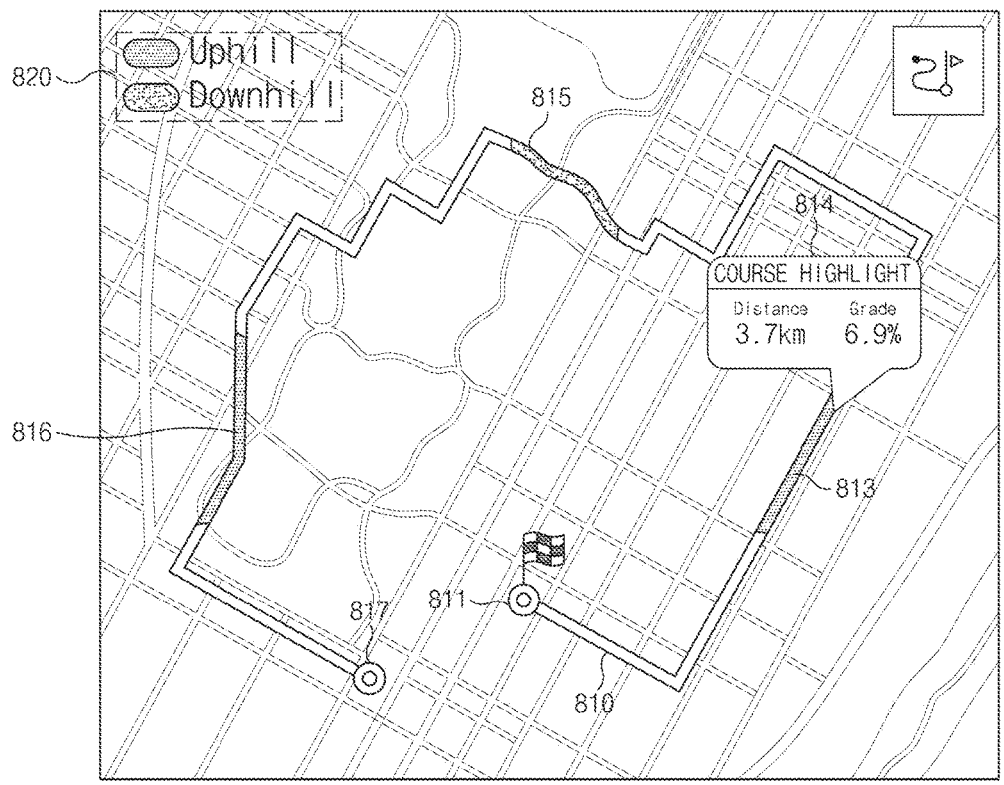
FIG. 8 is a view illustrating an analysis-completed map screen according to an embodiment of the present disclosure.

Section information analyzed by the key section extraction module 430 may be reflected on a map where a workout route is displayed by the workout guide map module 356. An example relating to this is shown in FIG. 8.

The reason that such section information is necessary is that the difficulty in a workout performance by each section may vary even in the same distance route, and a guide method necessary for a workout may vary according to whether a corresponding section is an uphill or a downhill. By increasing a percentage for completing a target and allowing a user to feel a sense of accomplishment through such a section analysis and a guide based on a section analysis result, the user may continue to have a target and continue to work out.

The coaching instruction extraction module 440 may include an uphill/downhill information analysis module 442, a rotation information analysis module 444, and a section determination and speed calculation module 446. The uphill/downhill information analysis module 442 may extract coaching instructions on a point determined as an uphill section or a downhill section. For example, the uphill/downhill information analysis module 442 may determine coaching instructions to be provided to a user based on a slope of an uphill section or a downhill section, information of a previous or subsequent section (for example, whether the next section is an uphill with a steeper slope, a flatland, or a downhill), or information on a location where a corresponding section is disposed in the entire workout route (for example, whether an uphill appears at the early part or end part of a workout route). Additionally, the uphill/downhill information analysis module 442 may differently determine coaching instructions to be provided to a user based on a user profile. For example, when a user is an advanced user or performs the same course several times, coaching instructions on a user's pace or the next section (for example, save strength in this section and adjust a gear to be low) may be omitted. However, when a user is a beginner or performs a corresponding course, detailed coaching instructions may be performed.

The rotation information analysis module 444 may determine coaching instructions to be provided to a portion including a rotation movement instead of a straight movement in a workout route. Additionally, if there is a section that maintains a predetermined speed in a straight section with respect to an inputted workout record (or workout route data), the section determination and speed calculation module 446 sections a corresponding section to be summarized as coaching instructions that guide a speed maintenance section.

The route level analysis module 450 may generate an estimation time of a target route, calorie consumption, and the maximum oxygen intake by utilizing workout type specific weight information. For example, workout related information may be categorized as follows. (1) workout estimated time, (2) VO2 Max Level, (3) stamina level, and (4) difficulty. Herein, (1) the workout estimation time may correspond to a workout specific expectation time by utilizing a user's record when providing a workout guide (2) the VO2 Max level may represent the maximum oxygen intake and may be analyzed based on a traveling distance (generally, the VO2 Max level is the maximum amount of oxygen that an individual can utilize during intense or maximal exercise, and it is generally measured as milliliters of oxygen used in one minute per kilogram of body weight). Additionally, (3) the stamina level may correspond to an index that represents an ability for maintaining a physical activity for a long time (4) the difficulty may correspond to a difficulty of a corresponding route determined by synthesizing the above information. This difficulty may be utilized as the selection criteria of a workout route. For example, the difficulty may be used for determining whether a workout is possible or changing a guide in comparison to a user's workout record or a user profile.

This information may be utilized as a material for generating coaching or program guide to allow a user to consume kinetic energy effectively and work out continuously in addition to a user profile or user's workout record (log) information.

According to an embodiment of the present disclosure, in order for an uphill and downhill analysis, the route information analysis module 352 (for example, the key section extraction module 430) removes abnormal location information, compensates each location specific slope, configure a slope group, and extract a workout specific/user specific slope section, A detailed method will be described with reference to FIGS. 6A to 6D.

Figure 5:
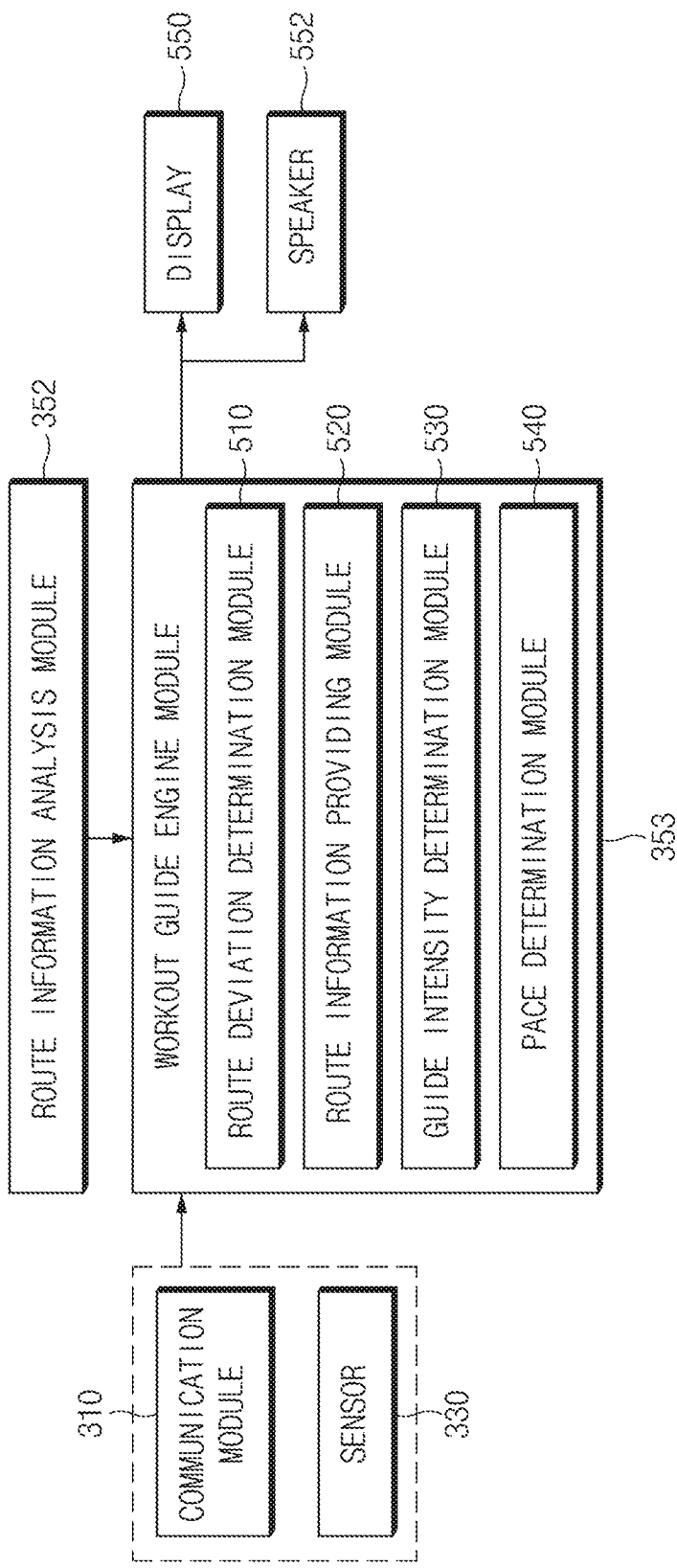
FIG. 5 is a view illustrating a configuration of a workout guide engine module according to an embodiment of the present disclosure.

FIG. 5 is a view illustrating a configuration of a workout guide engine module according to an embodiment of the present disclosure.

When an analysis on workout route information selected based on the content described with reference to FIGS. 1 to 4 is completed and a user starts to work out, the workout guide engine module 353 may start. The workout guide engine module 353 may obtain analysis-completed workout route data from the route information analysis module 352 and also obtain the current workout state information from a means for collecting the user's current workout state information such as the communication module 310 or the sensor 330. Based on the analysis-completed workout route information, the workout guide engine module 353 may operate each time workout state information of the current user is updated. Guide information provided by the workout guide engine module 353 may be visually outputted to the display 550 or audibly outputted through the speaker 552. In addition, guide information may be provided through vibration or various output modules 150 such as via one or more light emitting diodes (LED's).

The workout guide engine module 353 may include a route deviation determination module 510, a route information providing module 520, a guide intensity determination module 530, and a pace determination module 540. When a user does not pass the start point of a section given as a target in a workout route, the route deviation determination module 510 may perform a function for calculating a distance from the current location to the start point and displaying a marker that connects the current location and the start point on a map. For example, the route deviation determination module 510 may display a marker on a map by interpolating latitude information and longitude information. In relation to this, referring to FIG. 9A, the current user may be located at a point 911 and a target section 913 starts from a point 912. In this case, the route deviation determination module 510 may display a marker 914 that connects the point 911 and the point 912 on a map. According to an embodiment of the present disclosure, the route deviation determination module 510 may perform an operation for providing a deviation warning sound after a user passes the start point of a workout given as a target and an operation for notifying route returning.

The route information providing module 520 also may operate after a user passes the start point of a workout given as a target. According to an embodiment of the present disclosure, a user may configure the entire workout route including a plurality of workout sections as a target workout route, or may configure only some sections of the entire route as a target section. For example, a user may target only a specific section (for example, a king of mountain (KOM) section, an off road section, and so on) among the entire workout sections and perform workout. Once a workout program starts, the workout guide map module 356 may display the start point of a target section and the user's current location on a map outputted to the display of the electronic device 100. Additionally, the workout guide map module 356 may display a target section, a workout route, or a travel route through which a user actually travels. Based on information obtained through the sensor 330, when it is determined that a user performs a workout given as a target, the route information providing module 520 may provide information on whether there is a route change ahead of a straight route (for example, turn left or turn right) and/or how far a route change is away. In addition, the route information providing module 520 may provide information on the remaining distance or time until an uphill, downhill or highlight section on the current user's location or route. Additionally, the route information providing module 520 may provide information on a slope of an uphill or downhill section in advance in order to allow a user to save a strength in preparation of an uphill section or change a gear ratio in correspondence to the slope of a section. According to an embodiment of the present disclosure, a time for providing guide information may be changed according to the degree of a slope. For example, in the case that the slope of an uphill section is steep, guide information is provided in advance (for example, a 500 m point before an uphill slope section starts) and in the case that the slope is low, guide information may be provided when it approaches a corresponding section (for example, a 50 m point before an uphill slope section starts) or after the slope is entered.

The guide intensity determination module 530 may determine the intensity of guide based on a user profile. For example, when the slope of an uphill section is high with respect to a user profile that a user inputs in advance, the guide intensity determination module 530 may notify benefit or reward before uphill section entry in order to achieve a higher target during the workout in the case that the user conquers a corresponding uphill section. When it is determined that the slope of an uphill section is greatly high and the length of the section is relatively long based on a user profile, the guide intensity determination module 530 may provide information that it is difficult to conquer the uphill section or suggest a user to challenger the next corresponding section in consideration that the user cannot climb. If the slope of an uphill section is low with respect to a user profile, the guide intensity determination module 530 may configure the intensity of guide to be weak.

The pace determination module 540 may determine whether a user's speed is behind a reference speed or whether a user works out in an excessive pace by calculating a section speed, an instant speed, and the entire average speed, which are obtained through the sensor 330. For example, if thirty (30) minutes (or mm) expected as a user passes the half of the entire workout section based on a user profile but the user actually completes in twenty (20) min, the pace determination module 540 may provide information that the user works out over pace, and/or speed/pace information to be adjusted.

FIGS. 6A to 6D are views illustrating a method of determining a slope section according to an embodiment of the present disclosure. The contents described with reference to FIGS. 6A to 6D may be performed by the route information analysis module 352 or the key section extraction module 430 of FIG. 4.

Figure 6A:
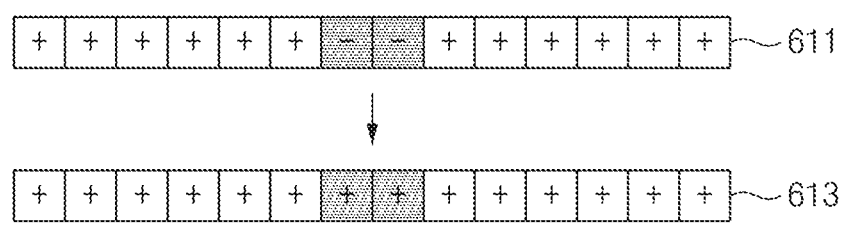

Generally obtained geographical information (for example, GPS information) may have a lot of error information. Accordingly, it may be effective that data analysis is performed after correction is performed, instead that the obtained information is used as workout distance information instantly and data analysis is performed. For example, the electronic device 100 may remove or correct data that is determined as abnormal by utilizing elevation, distance, latitude, and longitude information. The electronic device 100, for example, may check the cases that an elevation value becomes a negative number suddenly or a great elevation difference occurs abnormally, correct (replace or remove) data to have linear data in comparison to peripheral data, or correct a numeral value by using an interpolation or extrapolation method. When an elevation value appears as a negative number in the middle in raw data 611, the electronic device 100, as shown in the example of FIG. 6A, may correct the elevation value to a positive number by referring to a peripheral elevation value. A section analysis may be performed later based on correction data 613.

Figure 6B:
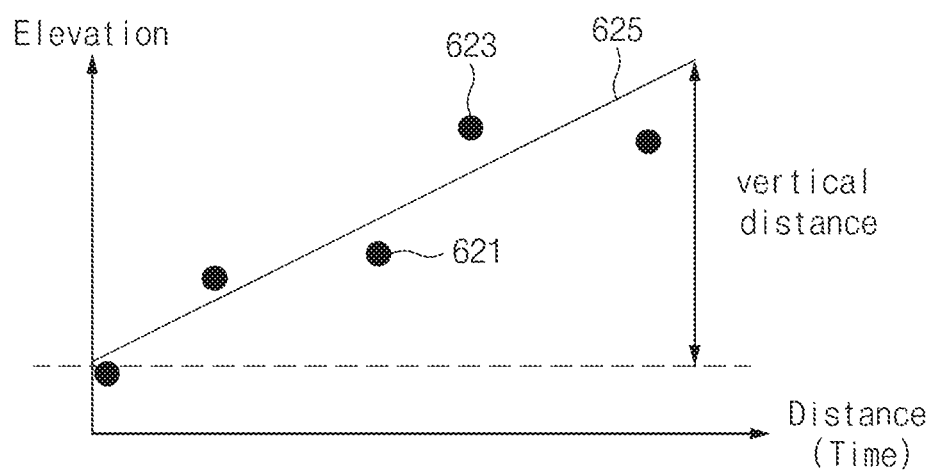

Since a storage period of route information obtained from an electronic device varies according to the type or configuration of the electronic device, the consistency may drop or errors may occur greatly. The electronic device 100 may determine a slope by each specific distance in order to correct such errors. For example, when a slope is obtained by each 15 m section on the two dimension, by applying a fitting technique as shown in FIG. 6B, data where calibration and standardization for uphill/downhill determination are applied may be obtained. For example, the electronic device 100 may obtain a slope 625 that is the closest or represents a corresponding section may be obtained by using data such as data 621 and 623 obtained by each predetermined section.

In the general cases, when it is assumed that an uphill has a slope of more than 5 degrees, by using slopes calculated through slope correction between two specific points, the electronic device 100 may divide the sections into flatland groups and slope sections. Especially, in order to determine an uphill section or a downhill section, a slope, a determination reference distance, a workout type, a user's workout level at each point may be applied together.

For example, when a point A to a point B are divided into 14 sections as shown in FIG. 6C to determine slopes (for example, each representative slope value is extracted through the method as in FIG. 6B), sections corresponding to p1 to p8 may obtain + slope values and sections corresponding to p9 to p14 may obtain − slope values. If more than 5 degrees are determined as an uphill slope section and less than −5 degrees are determined as a downhill slope section, p1 to p3 and p6 to p8 are determined as uphill slope sections (group 1), and p9 and p13 and p14 are determined as downhill slope sections (group 1), and p4 and p5 and p10 to p12 are determined as flat sections (group 2).

However, according to an embodiment of the present disclosure, even if a section is classified as corresponding to a flat section, in consideration of a previous slope section and a subsequent slope section, an uphill section and a downhill section, which are appropriate for continuous workout effects, may be determined. For example, if the length of a flat section is less than a reference length (for example, less than three sections) and a previous section and a subsequent section are classified as uphill slope sections, even when the slope of a corresponding section is not determined as an uphill, a section including the previous/subsequent slope section and the flat section may be determined as uphill sections. For example, p1 to p8 are configured as uphill sections and p9 to p14 are configured as downhill sections finally in FIG. 6C. This may be similarly applied when a short uphill or flatland is included between the downhill groups or a short uphill/downhill is included between flatland groups.

Additionally, there may be a section that has a short distance or is not helpful for a workout effect among uphill/downhill sections found in a previous operation. In this case, according to the type of a workout or a user's profile (or workout capability), a slope section for improving workout effects may be corrected.

Figure 6D:
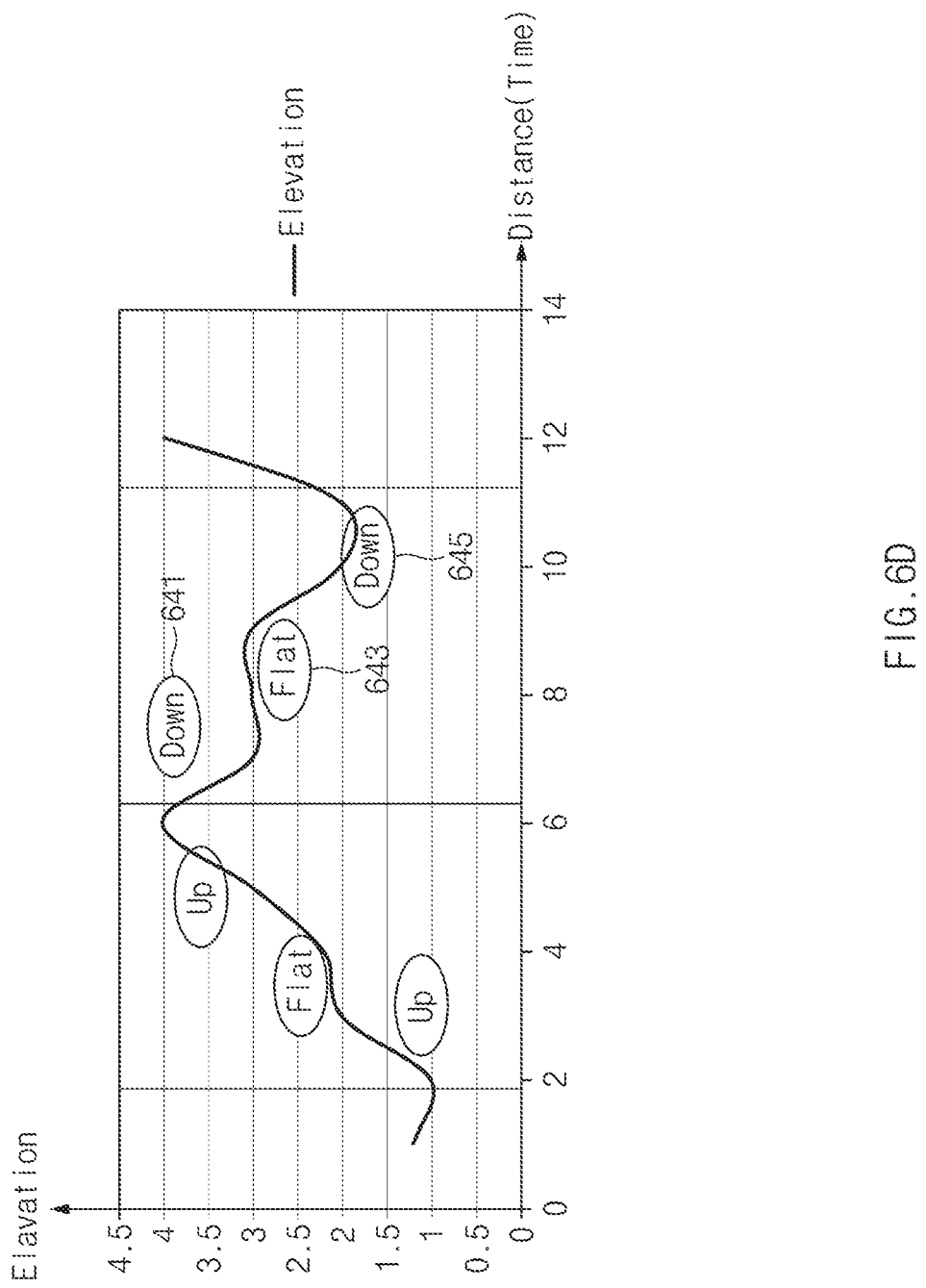

For example, in the case of bicycle workout, since calorie consumption occurs rarely in a flat section immediately following a downhill section or an uphill section that is low (that is, a slope is weak) and has a short length, workout may be less effective. For example, as shown in FIG. 6D, when a section following a section 641 having a large slope has a small slope and thus is classified as a flatland based on an analysis result of elevation information and there is an uphill section 643 having a short distance, the section 641 and the section 643 (or including the following downhill section 645) are bound and configured as a downhill section. The example of FIG. 6D may be understood as one example of FIG. 6C.

In the description with reference to FIGS. 1 to 6, an operation performed by each module may be understood as a function performed by the processing module 140 (for example, a processor). That is, the name of each module is not limited and based on the function to be performed, the workout program manager 350 or the workout application 360 may be implemented variously in order to perform the above function.

Figure 7:
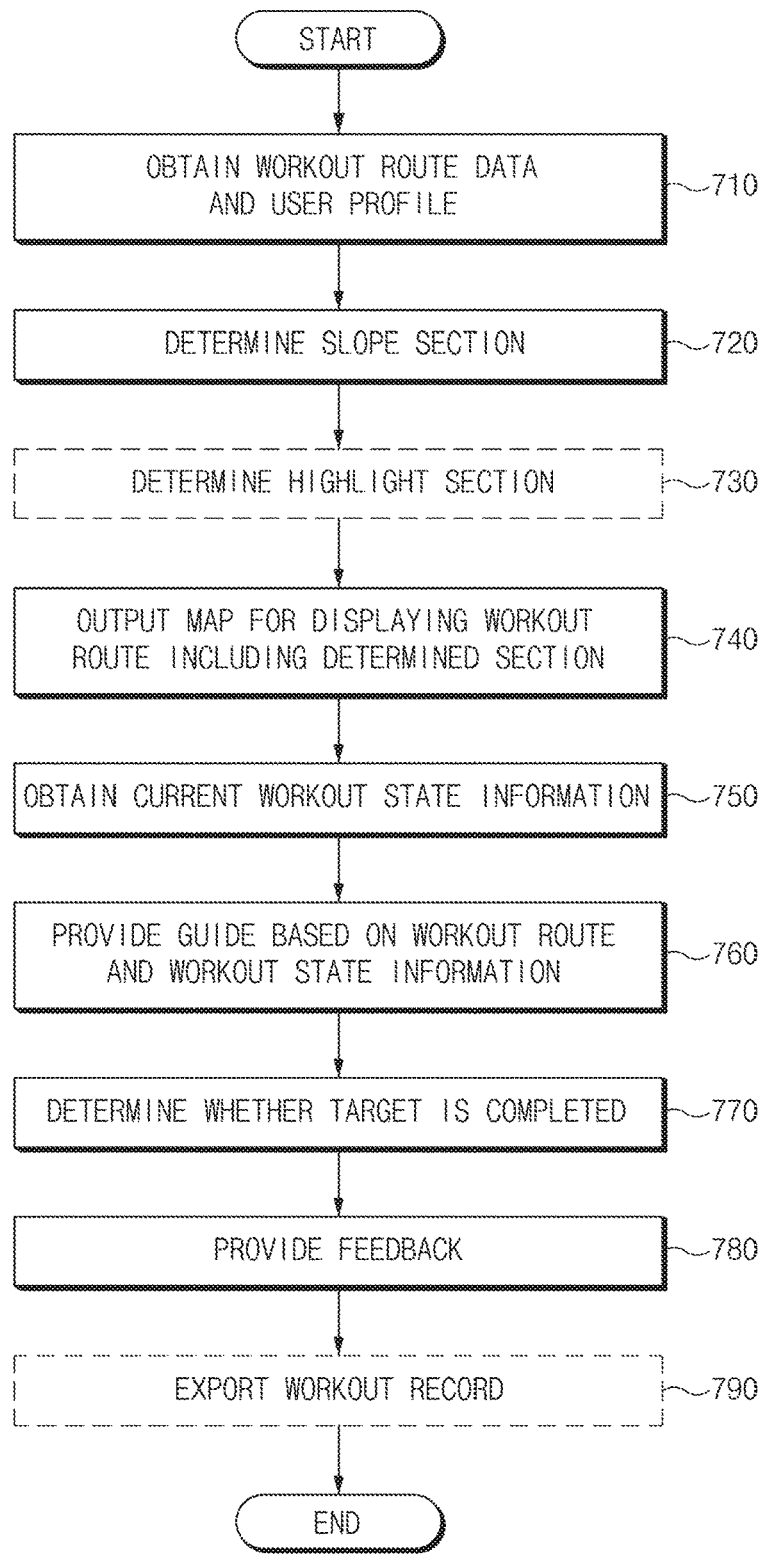
FIG. 7 is a view illustrating a process for analyzing and outputting workout route data and providing workout guide according to an embodiment of the present disclosure.

FIG. 7 is a view illustrating a process for analyzing and outputting workout route data and providing workout guide according to an embodiment of the present disclosure. The process of FIG. 7 represents a flow of operations of the above-mentioned modules and an operation of the above arbitrary module that may be added.

Referring to FIG. 7, in operation 710, the electronic device 100 may obtain workout route data and a user profile. The workout route data and/or the user profile may be disposed inside the electronic device 100 or downloaded from an external server. Additionally, the workout route data may be in a structured document format (for example, xml) including location data and elevation data.

In operation 720, the electronic device 100 may analyze workout route data and determine a slope section based on a user profile. For example, the electronic device 100 may determine at least one slope section by using location data and elevation data. At least one slope section may be determined differently according to a user profile. For example, a section determined as an uphill to a first user may be determined as a flat section to a second user.

In operation 730, the electronic device 100 may determine a highlight section among a plurality of sections included in a workout route, based on a specified condition. For example, an electronic device may determine, as a highlight section, at least one of a section that consumes the highest calorie, a section that takes the longest time in completing the whole course, a section having the most greatly changing elevation, and the longest section. According to an embodiment of the present disclosure, the highlight section determination in operation 730 may be omitted.

In operation 740, the electronic device 100 may output a map that displays a workout route including a section determined in operation 720 or operation 730 to the display of the electronic device 100. Herein, each section may be displayed in a different form and color on a map based on the feature of a section, for example, the slope of a section, or a determination result on a section in operation 720. An example relating to this is described with reference to FIGS. 8 to 13.

When a map including a workout route is provided in operation 740, a user may easily check information on an uphill section or downhill section included in a corresponding workout route in addition to general information (for example, distance, elevation, gain, and so on) in a corresponding workout route, through the map. The user may select a suggested workout route to perform workout or select another workout route.

Operation 710 to operation 740 may be performed by the route information analysis module 352 of FIG. 4 as a processor for analyzing and outputting workout route data. The following operation 750 to operation 790 may correspond to a process for providing workout guide based on an analysis result. The process of FIG. 7 may be performed continuously but operation 750 to operation 790 may be performed after a predetermined time once operation 710 to operation 740 are performed.

In operation 750, the electronic device 100 may obtain workout state information of the current user (or the electronic device 100) through the sensor 330. For example, the location of the current user, the traveling speed of the current user, and a state of the current workout device (for example, the revolution of a cycle wheel (for example, revolutions per minute (RPM)) may be obtained. According to an embodiment of the present disclosure, the electronic device 100 may display the current location of a user on a map outputted to the display. In this case, the user's current location and a workout route selected by a user may be displayed together on the map. Additionally, according to an embodiment of the present disclosure, in addition to the map, information for representing the current workout state such as the user's current speed, a workout duration time, and a workout distance may be outputted to the display of the electronic device 100.

In operation 760, the electronic device 100 may provide workout guide based on a workout route and a user's current workout state. For example, when a user is deviated from a route or enters a target route or a target section, or a new section starts, or a new section is scheduled to start soon, the electronic device 100 may provide workout guide based on a user profile.

In operation 770, the electronic device 100 may determine whether the user completes a workout target. For example, when the entire workout route or a section of a workout route is configured as a target section, the electronic device 100 may determine whether a parameter that a user targets such as a time, calorie consumption, or a traveling distance is satisfied.

In operation 780, when it is determined that a target is achieved or target achievement is failed, the electronic device 100 may provide a feedback corresponding thereto. For example, the electronic device 100 may provide an appropriate form of reward (for example, provides comments, image or the next step workout course) to a user.

In operation 790, the electronic device 100 may export a workout record performed by a user. For example, when a user performs a workout on a specific workout route, information on the time and speed that the user performs may be exported in GPX format. The exported workout route data may be shared with another user or may be utilized to be reflected on a user's workout record.

Hereinafter, with reference to FIGS. 8 to 13, various screens to be provided to the display of the electronic device 100 are described. Drawings described below may be modified in various forms that reflect the above-mentioned technical ideas.

FIG. 8 is a view illustrating an analysis-completed map screen according to an embodiment of the present disclosure.

The electronic device 100 may generate a map screen shown in FIG. 8 from user's or another user's workout route data. According to an embodiment of the present disclosure, when importing a GPX file, the electronic device 100 may clarify the start and end points of a workout route and draw a route in a polyline form on a map in order to allow a user to check schematic information of the entire progressing direction and a route. For example, a red-colored uphill section (or the highest calorie consumption section), a yellow-colored downhill section where a user increases speed, and sections for the maximum calorie consumption as a highlight section may be provided. For example, the start point of the workout may be displayed as a point 811 and the end point of the workout may be displayed as a point 817. A workout route 810 starting from the point 811 and ending at the point 817 may include a flat section, a highlight section 813, a downhill section 815, and an uphill section 816. A pop-up 814 for representing specific information may be provided with respect to the highlight section 813. For example, the highlight section 813, as a 3.7 km course with a 6.9 degree slope, may correspond to the most calorie consumption section. Additionally, a map screen may include a legend 820 for representing an uphill section or a downhill section. In such a manner, situations occurring during an actual workout may be identified in advance by identifying sections in a workout route in advance.

Since a user cannot identify slope information from conventional map information, even if a user looks at a workout route displayed on a map, it is difficult to identify whether the workout route is appropriate for the workout (for example, walking, running, biking, and cycling) that a user is to perform or whether the user is capable of finishing the workout route. In the case that a user mainly performs cycling, a 50 km workout route formed of a flat land may be boring to the user and in the case that a user enjoys marathon, a 10 km workout route formed of an uphill may be terrible for the user. Especially, a targeted workout element may vary according to each user. For example, some users may place emphasis on workout time or workout distance but some users may place emphasis on calorie consumption and the completion of a famous course used for competition. Additionally, some users may want to practice an uphill section intensively and some users may want to practice a downhill section intensively.

When information is provided in the form shown in FIG. 8, a user may easily check whether a corresponding workout route is appropriate for the type of a workout that the user is to perform and a workout element targeted by the user. A user who wants more uphill sections may load another GPX file and analyze a workout route to select an appropriate workout program.

Figure 9A:
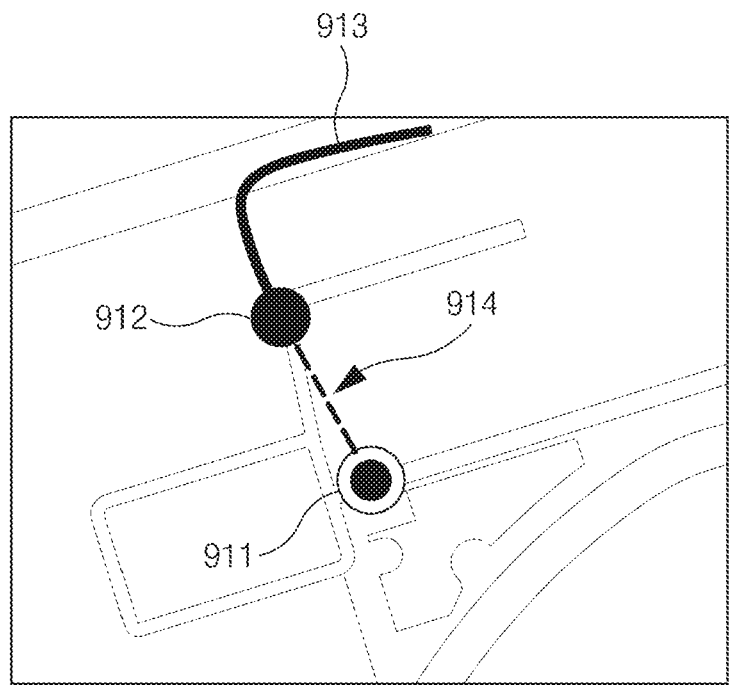
FIGS. 9A to 9C are views illustrating a display screen providing a workout route guide according to various embodiments of the present disclosure.
Figure 9B:
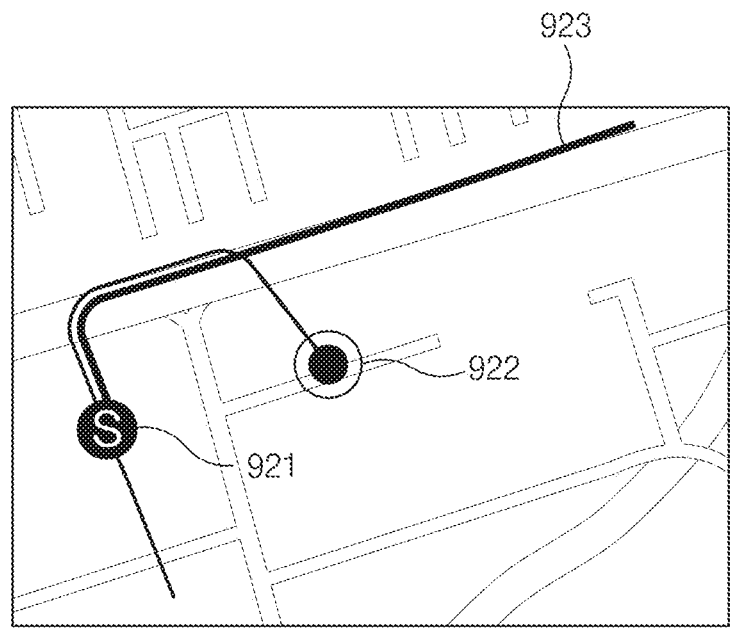
Figure 9C:
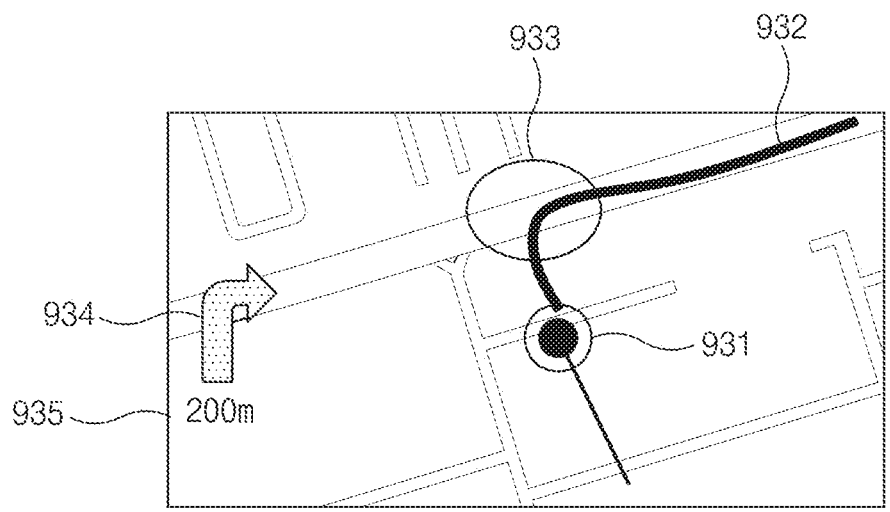

FIGS. 9A to 9C are views illustrating a display screen providing a workout route guide according to an embodiment of the present disclosure.

FIG. 9A illustrates that as described above, when the user's current location 911 does not reach the start point 912 of a target section 913, a map screen displaying this is shown. GIS (for example, road network information, such as geographic information systems) database may not be available always, and accordingly, the electronic device 100 may display a straight distance 914 between the current location 911 and the start point 912 on the map as shown in FIG. 9A (for example, 200 m from start point). The electronic device 100 may obtain GPS information (for example, latitude and longitude information) of the user's current location 911 and latitude and longitude information of the start point 912, and display an icon (for example, the straight distance 914) for a hint through interpolation between two points.

FIG. 9B illustrates an example of a guide provided when a user passes a start point 921 of a target section 923 and then is deviated from the target section 923. In this case, when the user's current location 922 is deviated more than a predetermined reference from the target section 923, the route deviation determination module 510 may notify that the user is deviated from a target route through a guide route (for example, the same display as the straight line 914 of FIG. 9A) or voice guide.

FIG. 9C illustrates an example of a guide provided at a point where direction changing is required after a user passes a start point 931 of a target section 932. According to an embodiment of the present disclosure, the electronic device 100 (for example, the rotation information analysis module 444 and the route information providing module 520) may predict rough rotation information by analyzing the form of a route in order to allow a user to proceed on a target section well. In the case of a GPS sensor, since an obtained value has an abnormal error and is not appropriate for direction analysis occasionally, the electronic device 100 may simplify location information through an additional logic and select it as a small set for determining rotation. The electronic device 100 may determine whether direction changing occurs from the selected value based on differences in latitude and longitude, and determine the degree of its rotation. Additionally, if there is a slight rotation, since the slight rotation may be meaningless for a user who performs workout such as cycling or running, the electronic device 100 may exclude the slight rotation. In the case that direction changing recognizable by a user is required, when it is determined that a user enters an estimated location 933, the electronic device 100 may provide a guide for direction changing through a user interface (UI) change or voice guide. For example, a UI corresponding to a direction to be changed 934 and the remaining distance 935 to a changing point may be provided.

Figure 10A:
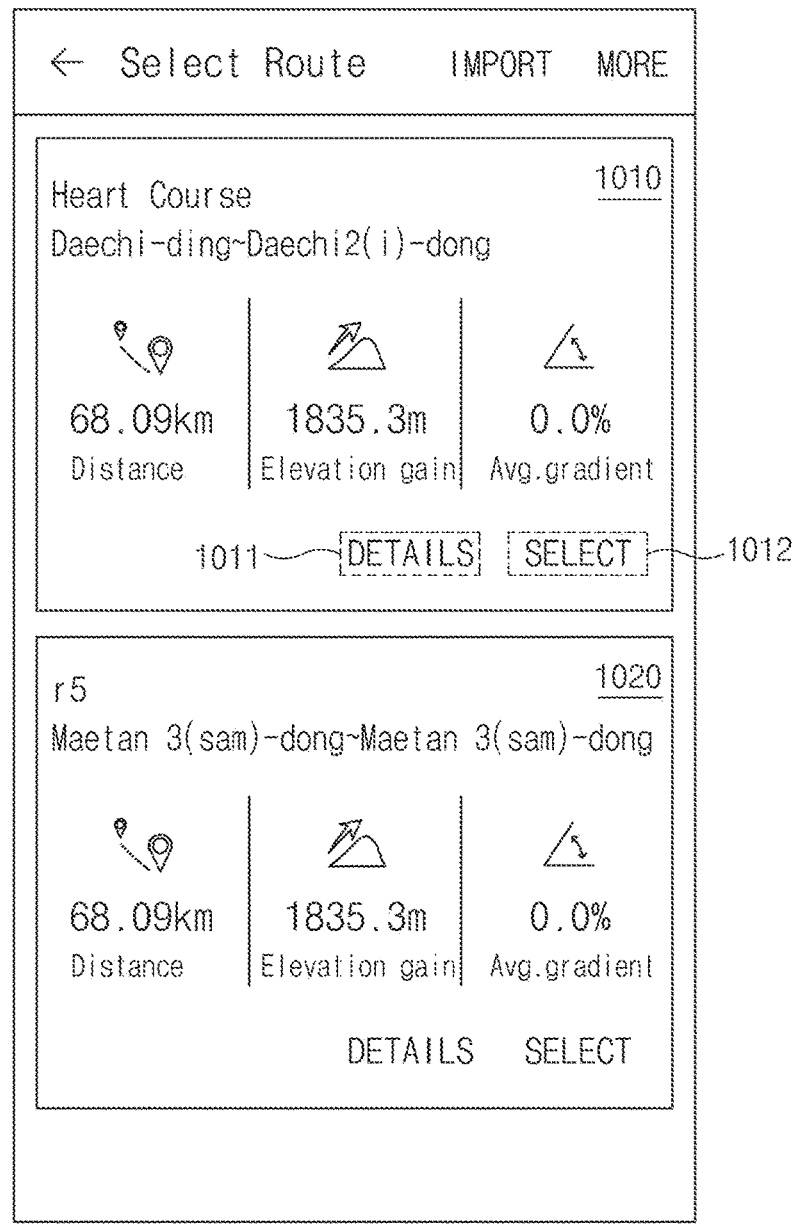
FIGS. 10A and 10B are views illustrating a workout route selection screen and a detailed screen of a workout route according to various embodiments of the present disclosure.
Figure 10B:
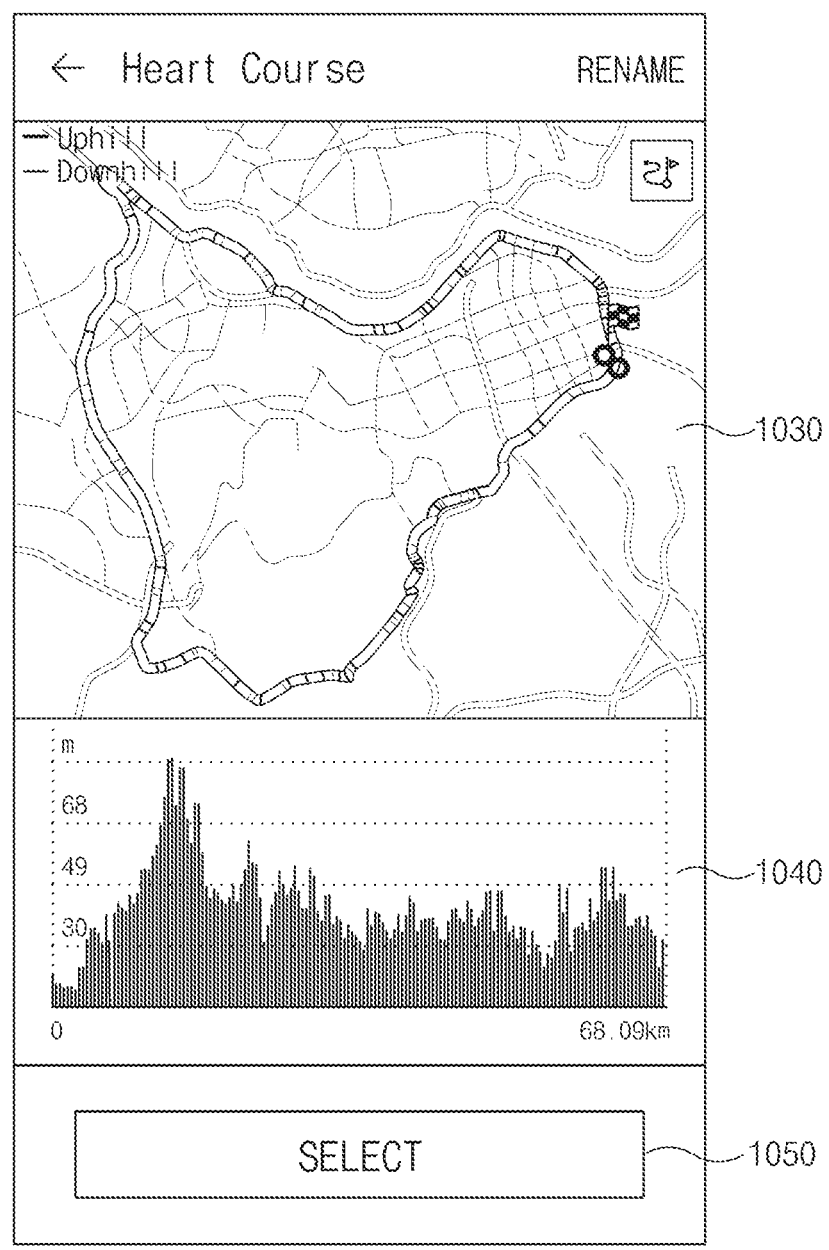

FIGS. 10A and 10B are views illustrating a workout route selection screen and a detailed screen of a workout route according to an embodiment of the present disclosure.

Referring to FIG. 10A, information on a plurality of selectable workout routes may be provided to a display. For example, two selectable workout routes of Heart Course 1010 and r5 1020 may be displayed on a UI of the workout application 360. In addition, a user may check information on another selectable workout route through scroll input.

The workout routes 1010 and 1020 shown in FIG. 1A, for example, may correspond to workout routes where an analysis on route information is completed. The information on workout route, for example, may include information such as the name of a workout route (or application program a region, a distance, an elevation gain, and an average slope. In order to check more detailed information on a workout route, when details 1011 for checking detail information of the workout route is selected, an electronic device may display a screen shown in FIG. 10B. For example, a map 1030 for displaying a workout route including at least one section differently displayed according to a slope, an elevation change 1040 from a start point to an end point, and a selection button 1050 (having the same function as the button 1012 of FIG. 10A) may be displayed. A screen configuration shown in FIG. 10B may be modified variously. For example, only the map 1030 may be displayed or it may be replaced with detailed information that the elevation change 1040 is provided as text (for example, workout time, workout distance, elevation gain, and estimated calories).

According to an embodiment of the present disclosure, when an IMPORT item is selected by a user, another workout information data file (for example, GPX file) stored in the storage 340 may be accessed. When an arbitrary workout information data file is selected, the workout program manager 350 may provide the screens shown in FIGS. 10A and 10B by analyzing a corresponding file.

Figure 11A:
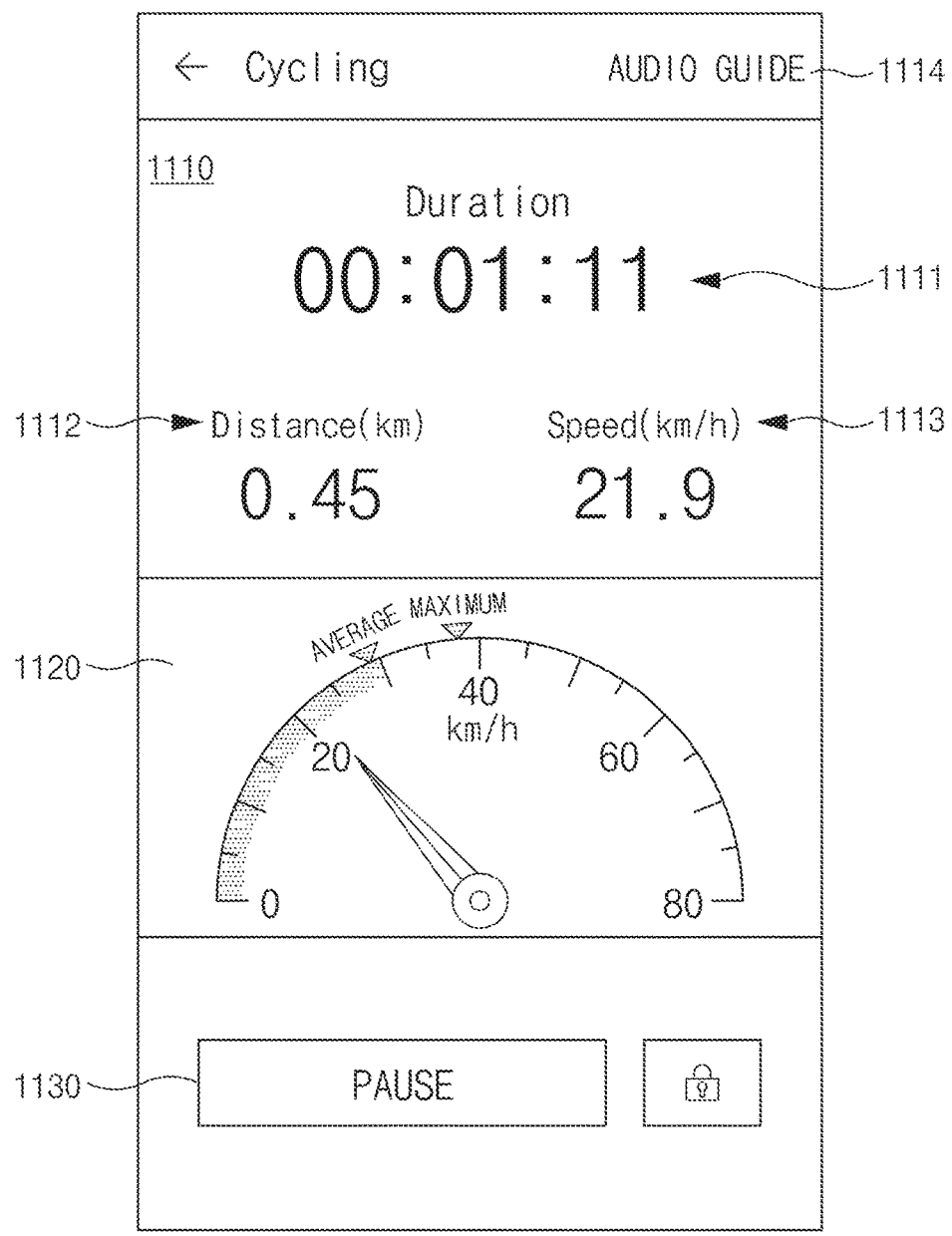
FIGS. 11A and 11B are views illustrating a workout guide providing screen according to various embodiments of the present disclosure.
Figure 11B:
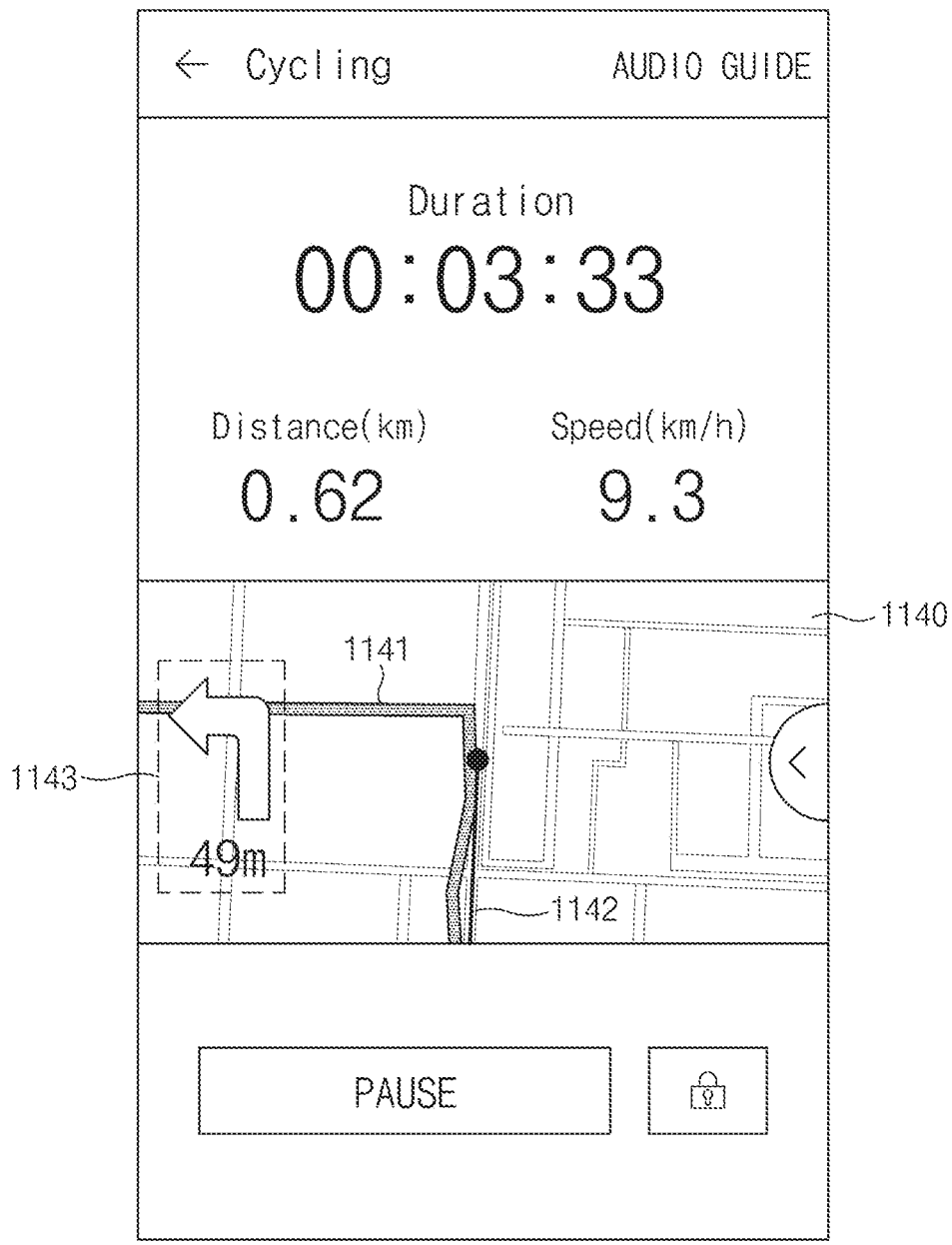

FIGS. 11A and 11B are views illustrating a workout guide providing screen according to an embodiment of the present disclosure.

Referring to FIG. 11A, a workout guide screen may include workout state information 1110 such as a workout duration time 1111, a workout distance 1112, and a current speed 1113. Additionally, the workout guide screen may display the current workout state in the form of an instrumental panel 1120. The current speed and an average/maximum speed may be displayed together on the instrumental panel 1120. As shown in FIG. 11B, instead of the instrumental panel 1120, a guide using a map screen 1140 may be provided. An analyzed workout route 1141, a user's actual traveling route 1142, and a guide for route 1143 may be displayed together on the map screen 1140. As shown in FIG. 11A or 11B, a screen for guide may be switched by user's selection or determined according to a predefined setting value. When a pause item 1130 is selected, recording a user's workout state and obtaining sensor information may be paused.

When traffic increases or a speed becomes faster, it may be dangerous to check a workout state through the display of the electronic device 100. According to an embodiment of the present disclosure, when an audio guide menu 1114 is selected, a display screen may be OFF (or maintained), and a duration time, a current speed, or the above-mentioned other various guides may be provided through a speaker of the electronic device 100 or a wired or wireless audio output device connected to the electronic device 100. According to an embodiment of the present disclosure, when a user exceeds a specified speed (for example, 20 km exceeded), the guide may be automatically switched to audio guide.

Figure 12A:
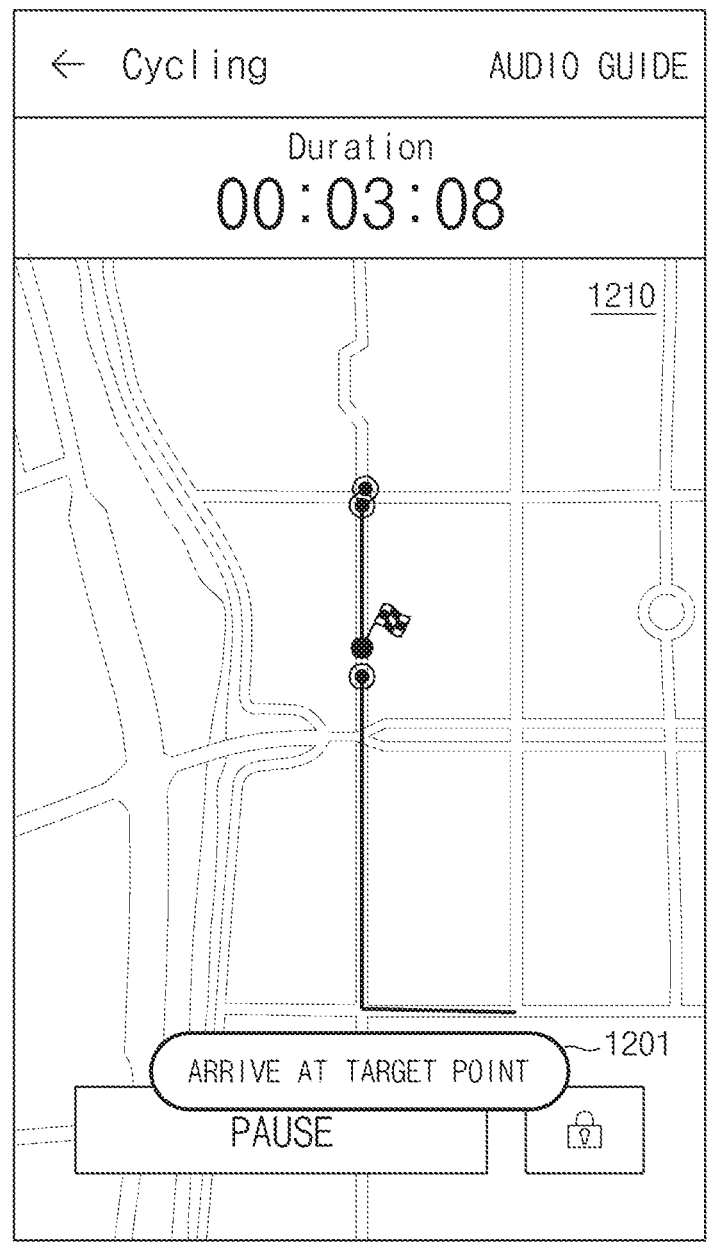
FIGS. 12A and 12B are views illustrating a guide for target completion according to various embodiments of the present disclosure.
Figure 12B:
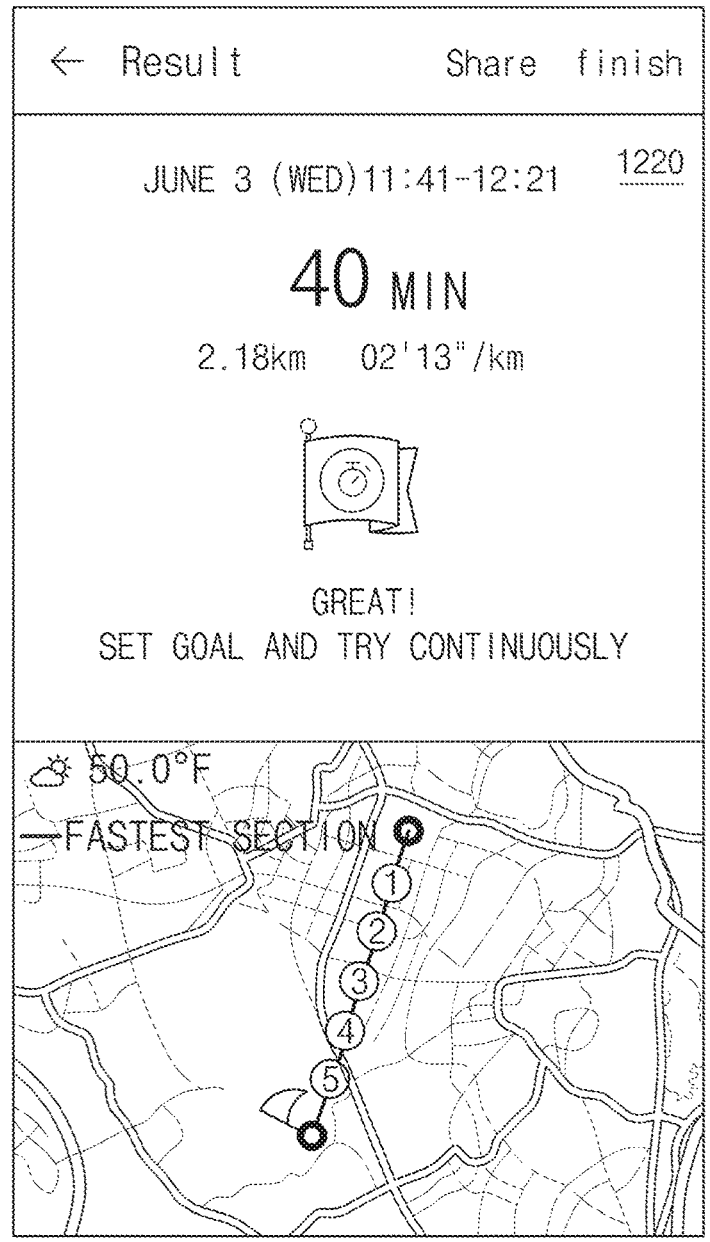

FIGS. 12A and 12B are views illustrating a guide for target completion according to an embodiment of the present disclosure.

Referring to FIG. 12A, when a user reaches a target point, a guide message 1211 for the target point arrival 1201 may be displayed on a map screen 1210. According to an embodiment of the present disclosure, when a set target is completed, for example, when a target that a user travels in 2 min 15 sec is completed (for example, completion in 2 min 13 sec), a guide or reward screen 1220 for target completion may be provided, as illustrated in FIG. 12B.

Figure 13A:
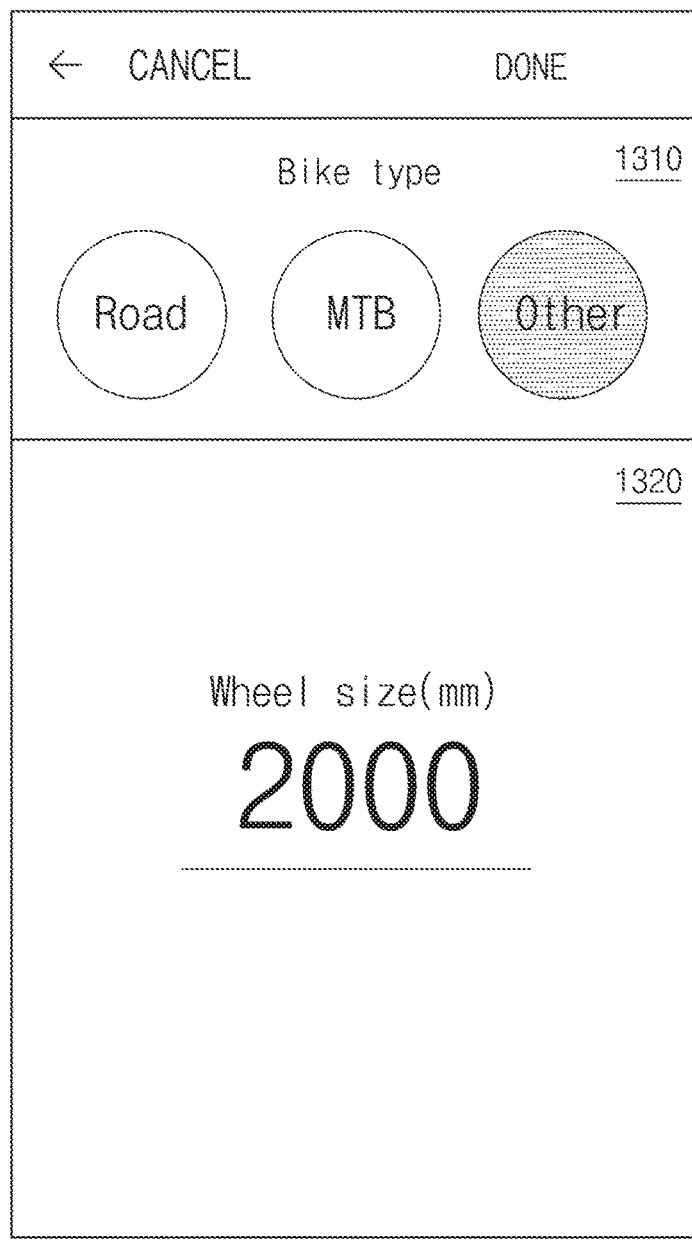
FIGS. 13A and 13B are views illustrating a screen for user information setting and workout record according to various embodiments of the present disclosure.
Figure 13B:
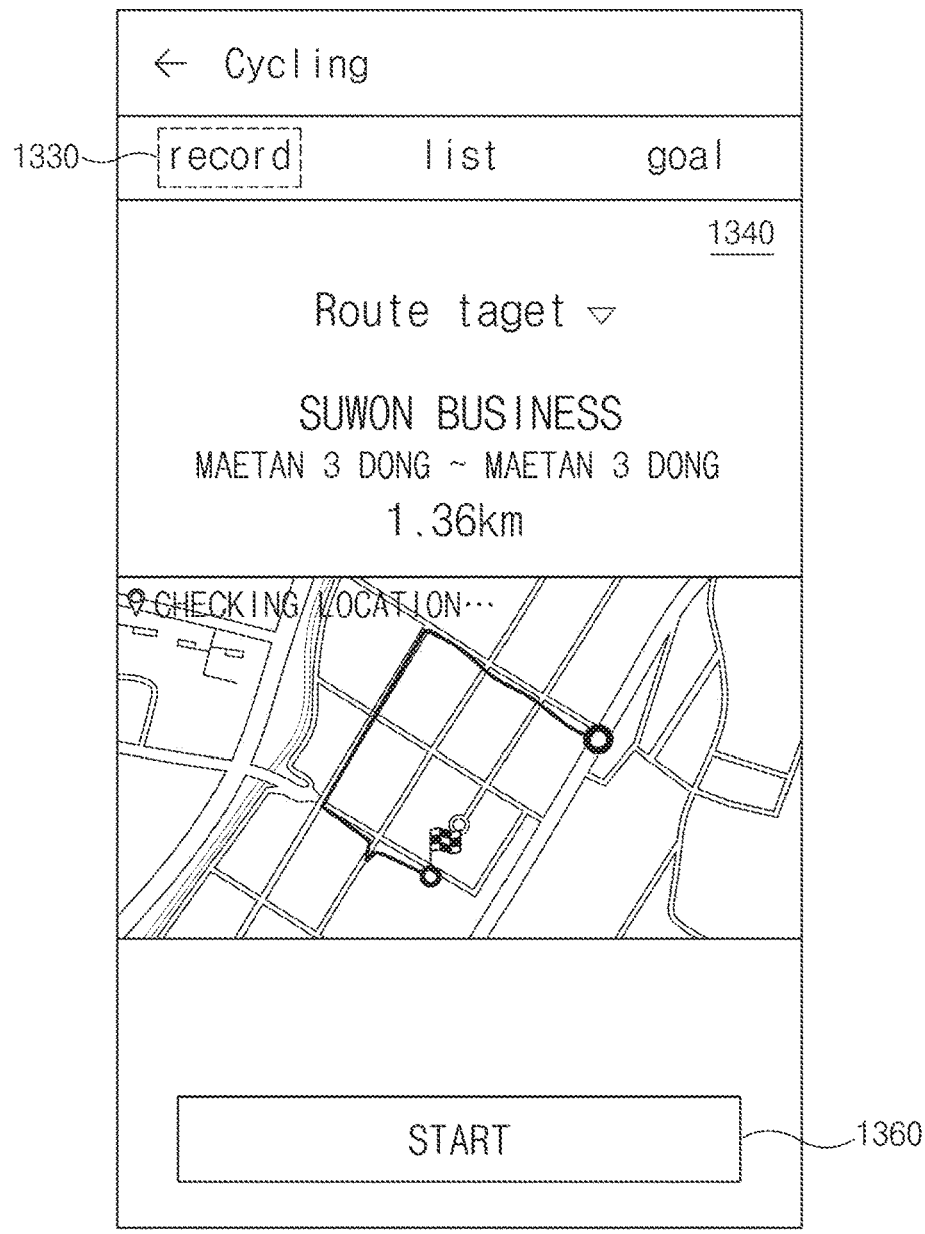

FIGS. 13A and 13B are views illustrating a screen for user information setting and workout record according to an embodiment of the present disclosure.

Referring to FIG. 13A, on a user profile setting screen, a user may input his or her bicycle type 1310 (for example, Road, mountain bike (MTB), and so on) and the wheel size 1320 of the bicycle. In addition, a user may input the user's name, nickname, height, weight, age, workout experience, workout level, and workout record 1330, as a user profile.

Referring to FIG. 13B, a user may configure a workout route and perform workout recording while working out along the workout route actually. For example, while actually working out on a route displayed on the map screen 1350, a user may record information such as elevation, rotation information, calorie consumption, heart rate, and a gear ratio change with respect to a target workout program 1340. The information recorded in such a way may be stored in GPX format to be shared with another user or utilized for the user's next workout. For example, a user may analyze workout information data recorded by the user and check it as shown in FIG. 8, and determine a workout program to be performed. FIG. 13B illustrates a start icon 1360 for initiating the workout route and performing a workout recording.

Figure 14:
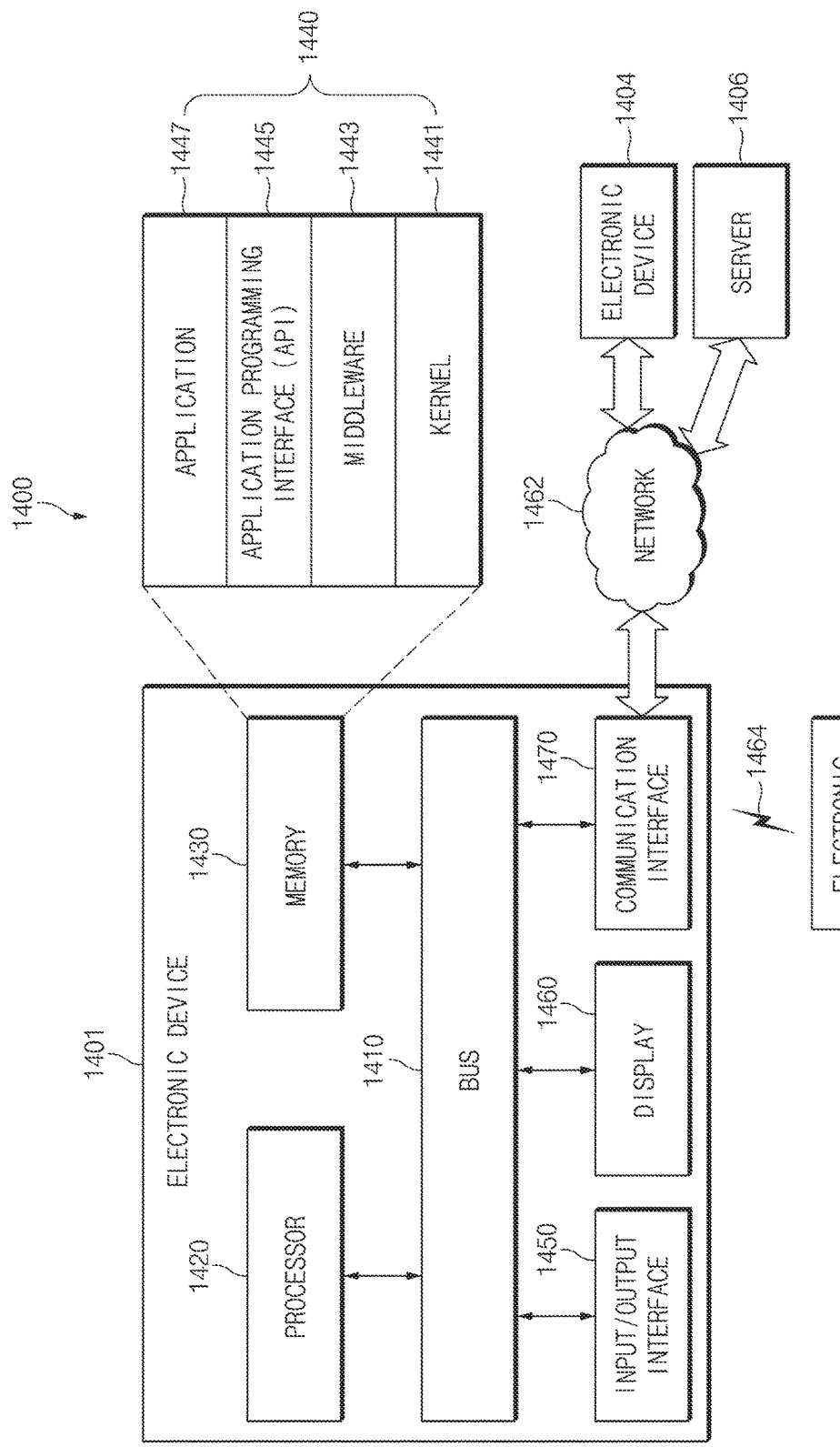
FIG. 14 is a view illustrating an electronic device in a network environment according to an embodiment of the present disclosure.

FIG. 14 is a view illustrating an electronic device in a network environment according to various embodiments of the present disclosure.

Referring to FIG. 14, an electronic device 1401 in a network environment 1400 is described according to various embodiments of the present disclosure. The electronic device 1401 may correspond to one embodiment of the electronic device 100. The electronic device 1401 may include a bus 1410, a processor 1420, a memory 1430, an input/output interface 1450, a display 1460, and a communication interface 1470. According to an embodiment of the present disclosure, the electronic device 1401 may omit at least one of the components or may additionally include a different component.

The bus 1410, for example, may include a circuit for connecting the components 1410 to 1470 to each other and delivering a communication (for example, control message and/or data) between the components 1410 to 1470.

The processor 1420 (for example, the processing module 140) may include at least one of a central processing unit (CPU), an application processor (AP), and a communication processor (CP). The processor 1420, for example, may execute calculation or data processing for control and/or communication of at least one another component of the electronic device 1401.

The memory 1430 (for example, the storage 130) may include volatile and/or nonvolatile memory. The memory 1430, for example, may store instructions or data relating to at least one another component of the electronic device 1401. According to an embodiment of the present disclosure, the memory 1430 may store software and/or program 1440. The program 1440 may include a kernel 1441, a middleware 1443, an application programming interface (API) 1445, and/or an application program (or an application) 1447. At least part of the kernel 1441, the middleware 1443, and the API 1445 may be called an operating system (OS).

The kernel 1441, for example, may control or manage system resources (for example, the bus 1410, the processor 1420, the memory 1430, and so on) used for performing operations or functions implemented in other programs (for example, the middleware 1443, the API 1445, or the application program 1447). Additionally, the kernel 1441 may provide an interface for controlling or managing system resources by accessing an individual component of the electronic device 1401 from the middleware 1443, the API 1445, or the application program 1447.

The middleware 1443, for example, may serve as an intermediary role for exchanging data as the API 1445 or the application program 1447 communicates with the kernel 1441.

Additionally, the middleware 1443 may process at least one job request received from the application program 1447 according to a priority. For example, the middleware 1443 may assign to at least one application program 1447 a priority for using a system resource (for example, the bus 1410, the processor 1420, or the memory 1430) of the electronic device 1401, For example, the middleware 1443 may perform scheduling or load balancing on the at least one job request by processing the at least one job request according to the priority assigned to the at least one job request.

The API 1445, as an interface for allowing the application program 1447 to control a function provided from the kernel 1441 or the middleware 1443, may include at least one interface or function (for example, an instruction) for file control, window control, image processing, or character control.

The input/output interface 1450, for example, may serve as an interface for delivering instructions or data inputted from a user or another external device to another component(s) of the electronic device 1401. Additionally, the input/output interface 1450 may output instructions or data received from another component(s) of the electronic device 1401 to a user or another external device.

The display 1460, for example, may include a liquid crystal display (LCD), a light emitting diode (LED) display, an organic light emitting diode (OLED) display, a microelectromechanical systems (MEMS) display, or an electronic paper display. The display 1460 may display various contents (for example, text, image, video, icon, symbol, and so on) to a user. The display 1460 may include a touch screen, and for example, may receive a touch, gesture, proximity, or hovering input by using an electronic pen or a user's body part.

The communication interface 1470 (for example, the communication module 310), for example, may set a communication between the electronic device 1401 and an external device (for example, the first external electronic device 1402, the second external electronic device 1404, or the server 1406). For example, the communication interface 1470 may communicate with an external device (for example, the second external electronic device 1404 or the server 1406) in connection to the network 1462 through wireless communication or wired communication.

The wireless communication, as a cellular communication protocol, may use at least one of long-term evolution (LTE), LTE Advance (LTE-A), code division multiple access (CDMA), wideband CDMA (WCDMA), universal mobile telecommunications system (UMTS), Wireless Broadband (WiBro), global system for mobile communications (GSM), and so on. Additionally, the wireless communication, for example, may include the short-range communication 1464. The short-range communication 1464, for example, may include at least one of Wi-Fi, BT, NFC, and GNSS. The GNSS may include at least one of GPS, Glonass, Beidou navigation satellite system (hereinafter referred to as Beidou), and the European global satellite-based navigation system (Galileo). Hereinafter, GPS and GNSS may be interchangeably used. The wired communication, for example, may include at least one of universal serial bus (USB), high definition multimedia interface (HDMI), recommended standard 232 (RS-232), and plain old telephone service (POTS). The network 1462 may include telecommunications network, for example, at least one of computer network (for example, local area network (LAN) or wide area network (WAN)), internet, and telephone network.

Each of the first and second external electronic devices 1402 and 1404 may have the same type as or a different type from the electronic device 1401. According to an embodiment of the present disclosure, the server 1406 may include a group of one or more servers. According to various embodiments of the present disclosure, all or part of operations executed on the electronic device 1401 may be executed on another one or more electronic devices (for example, the electronic device 1402 or 1404 or the server 1406), According to an embodiment of the present disclosure, when the electronic device 1401 performs a certain function or service automatically or by a request, it may request at least part of a function relating thereto from another device (for example, the electronic device 1402 or 1404 or the server 1406) instead of or in addition to executing the function or service by itself. The other electronic device (for example, the external electronic device 1402 or 1404 or the server 1406) may execute a requested function or an additional function and may deliver an execution result to the electronic device 1401. The electronic device 1401 may provide the requested function or service as it is or by processing the received result additionally. For this, for example, cloud computing distributed computing, or client-server computing technology may be used.

Figure 15:
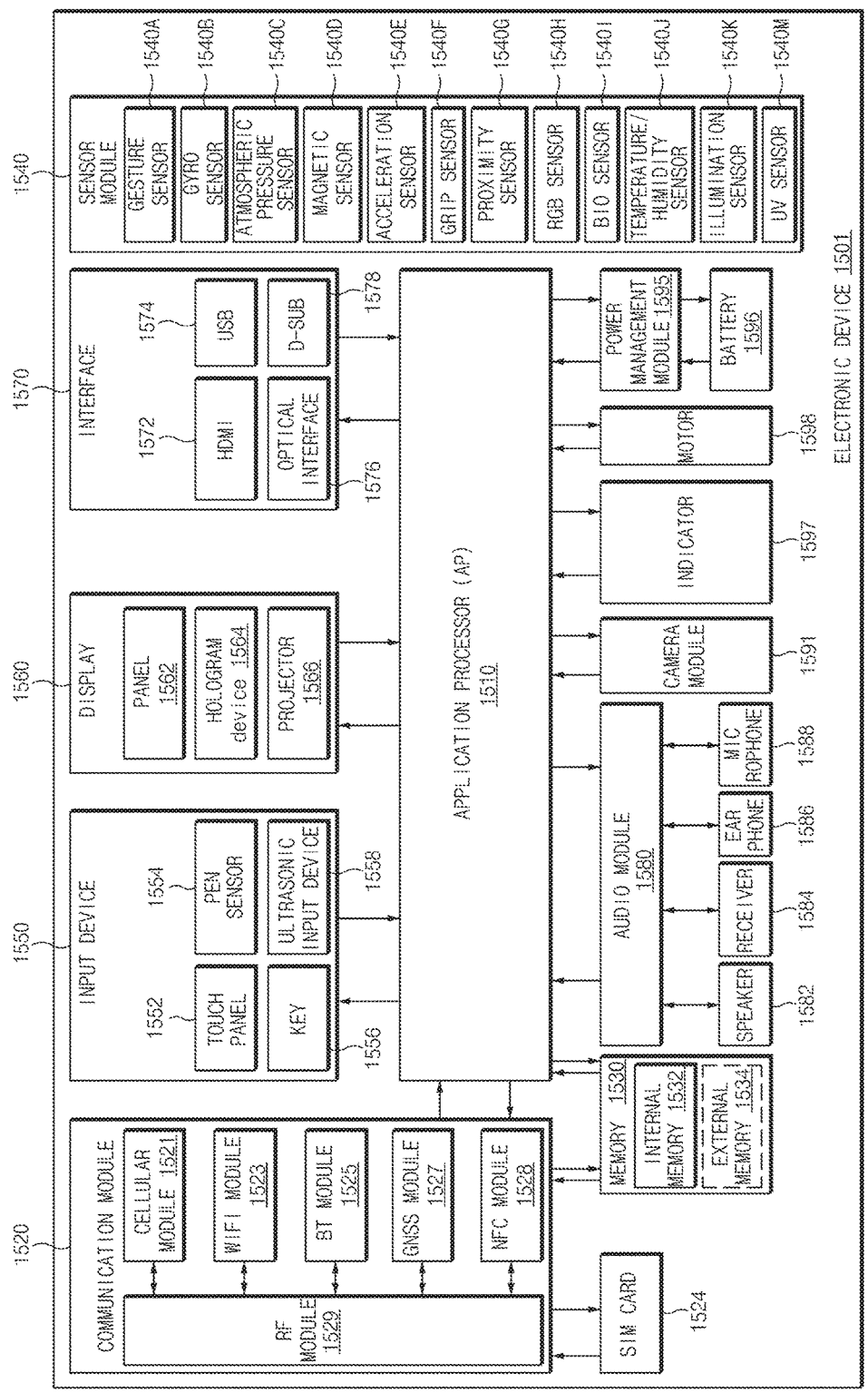
FIG. 15 is a block diagram illustrating an electronic device according to an embodiment of the present disclosure.

FIG. 15 is a block diagram of an electronic device according to various embodiments of the present disclosure.

Referring to FIG. 15, an electronic device 1501, for example, may include all or part of the above-mentioned electronic device 1401 shown in FIG. 14. The electronic device 1501 may include at least one processor (for example, an application processor (AP) 1510), a communication module 1520, a subscriber identification module (SIM) 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may control a plurality of hardware or software components connected thereto and also may perform various data processing and operations by executing an operating system or an application program. The processor 1510 may be implemented with a system on chip (SoC), for example. According to an embodiment of the present disclosure, the processor 1510 may further include a graphic processing unit (CPU) (not shown) and/or an image signal processor. The processor 1510 may include at least part (for example, the cellular module 1521) of components shown in FIG. 15. The processor 1510 may load commands or data received from at least one of other components (for example, nonvolatile memory) and process them and may store various data in a nonvolatile memory.

The communication module 1520 may have the same or similar configuration to the communication interface 1470 of FIG. 14. The communication module 1520, for example, may include a cellular module 1521, a Wi-Fi module 1523, a BT module 1525, a GNSS module 1527 (for example, a GPS module, a Glonass module, a Beidou module, or a Galileo module), an NFC module 1528, and a radio frequency (RF) module 1529.

The cellular module 1521, for example, may provide voice call, video call, text service, or internet service through communication network. According to an embodiment of the present disclosure, the cellular module 1521 may perform a distinction and authentication operation on the electronic device 1501 in a communication network by using a SIM (for example, a SIM card) 1524. According to an embodiment of the present disclosure, the cellular module 1521 may perform at least part of a function that the processor 1510 provides. According to an embodiment of the present disclosure, the cellular module 1521 may further include a communication processor (CP).

Each of the Wi-Fi module 1523, the BT module 1525, the GNSS module 1527, or the NEC module 1528 may include a processor for processing data transmitted/received through a corresponding module. According to an embodiment of the present disclosure, at least part (for example, at least one) of the cellular module 1521, the Wi-Fi module 1523, the BT module 1525, the GNSS module 1527, and the NFC module 1528 may be included in one integrated chip (IC) or IC package.

The RF module 1529, for example, may transmit/receive communication signals (for example, RF signals). The RF module 1529, for example, may include a transceiver, a power amp module (PAM), a frequency filter, a low noise amplifier (LNA), or an antenna. According to another embodiment of the present disclosure, at least one of the cellular module 1521, the Wi-Fi module 1523, the BT module 1525, the GNSS module 1527, and the NFC module 1528 may transmit/receive RF signals through a separate RF module.

The SIM 1524, for example, may include a card including a SIM and/or an embedded SIM and also may include unique identification information (for example, an integrated circuit card identifier (ICCID)) or subscriber information (for example, an international mobile subscriber identity (IMSI)).

The memory 1530 (for example, the memory 1430) may include an internal memory 1532 or an external memory 1534. The internal memory 1532 may include at least one of a volatile memory (for example, dynamic random access memory (DRAM), static RAM (SRAM), synchronous dynamic RAM (SDRAM)) and a non-volatile memory (for example, one time programmable read-only memory (OTPROM), programmable ROM (PROM), erasable and programmable ROM (EPROM), electrically erasable and programmable ROM (EEPROM), mask ROM, flash ROM, flash memory (for example, NAND flash memory or NOR flash memory), hard drive, or solid state drive (SSD)).

The external memory 1534 may further include flash drive, for example, compact flash (CF), secure digital (SD), Micro-SD, Mini-SD, extreme digital (xD), (multi-media card (MMC), or a memorystick. The external memory 1534 may be functionally and/or physically connected to the electronic device 1501 through various interfaces.

The sensor module 1540 measures physical quantities or detects an operating state of the electronic device 1501, thereby converting the measured or detected information into electrical signals. The sensor module 1540 may include at least one of a gesture sensor 1540A, a gyro sensor 1540B, a barometric (or atmospheric) pressure sensor 1540C, a magnetic sensor 1540D, an acceleration sensor 1540E, a grip sensor 1540F, a proximity sensor 1540G, a color or RGB sensor 1540H (for example, a red, green, blue (RGB) sensor), a biometric sensor 1540I, a temperature/humidity sensor 1540J, an illumination sensor 1540K, and an ultra violet (UV) sensor 1540M. Additionally or alternatively, the sensor module 1540 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 1540 may further include a control circuit for controlling at least one sensor therein. According to an embodiment of the present disclosure, the electronic device 1501 may further include a processor configured to control the sensor module 1540 as part of or separately from the processor 1510 and thus may control the sensor module 1540 while the processor 1510 is in a sleep state.

The input device 1550 may include a touch panel 1552, a (digital) pen sensor 1554, a key 1556, or an ultrasonic input device 1558. The touch panel 1552 may use at least one of capacitive, resistive, infrared, or ultrasonic methods, for example. Additionally, the touch panel 1552 may further include a control circuit. The touch panel 1552 may further include a tactile layer to provide tactile response to a user.

The (digital) pen sensor 1554, for example, may include a sheet for recognition as part of a touch panel or a separate sheet for recognition. The key 1556 may include a physical button, an optical key, or a keypad, for example. The ultrasonic input device 1558 may detect ultrasonic waves generated from an input tool through a microphone (for example, the microphone 1588) in order to check data corresponding to the detected ultrasonic waves.

The display 1560 (for example, the display 1460) may include a panel 1562, a hologram device 1564, or a projector 1566. The panel 1562 may have the same or similar configuration to the display 1460 of FIG. 14. The panel 1562 may be implemented to be flexible, transparent, or wearable, for example. The panel 1562 and the touch panel 1552 may be configured with one module. The hologram device 1564 may show three-dimensional images in the air by using the interference of light. The projector 1566 may display an image by projecting light on a screen. The screen, for example, may be placed inside or outside the electronic device 1501. According to an embodiment of the present disclosure, the display 1560 may further include a control circuit for controlling the panel 1562, the hologram device 1564, or the projector 1566.

The interface 1570 may include a high-definition multimedia interface (HDMI) 1572, a universal serial bus (USB) 1574, an optical interface 1576, or a D-subminiature (sub) 1578, for example. The interface 1570, for example, may be included in the communication interface 1470 shown in FIG. 14. Additionally or alternatively, the interface 1570 may include a mobile high-definition link (MHL) interface, a secure Digital (SD) card/multi-media card (MMC) interface, or an infrared data association (IrDA) standard interface.

The audio module 1580 may convert sound into electrical signals and convert electrical signals into sounds. At least some components of the audio module 1580, for example, may be included in the input/output interface 1450 shown in FIG. 14. The audio module 1580 may process sound information inputted/outputted through a speaker 1582, a receiver 1584, an earphone 1586, or a microphone 1588.

The camera module 1591, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 1595 may manage the power of the electronic device 1501. According to an embodiment of the present disclosure, the power management module 1595 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1596, or a voltage, current, or temperature thereof dud ng charging. The battery 1596, for example, may include a rechargeable battery and/or a solar battery.

The indicator 1597 may display a specific state of the electronic device 1501 or part thereof (for example, the processor 1510), for example, a booting state, a message state, or a charging state. The motor 1598 may convert electrical signals into mechanical vibration and may generate vibration or haptic effect. Although not shown in the drawings, the electronic device 1501 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 16:
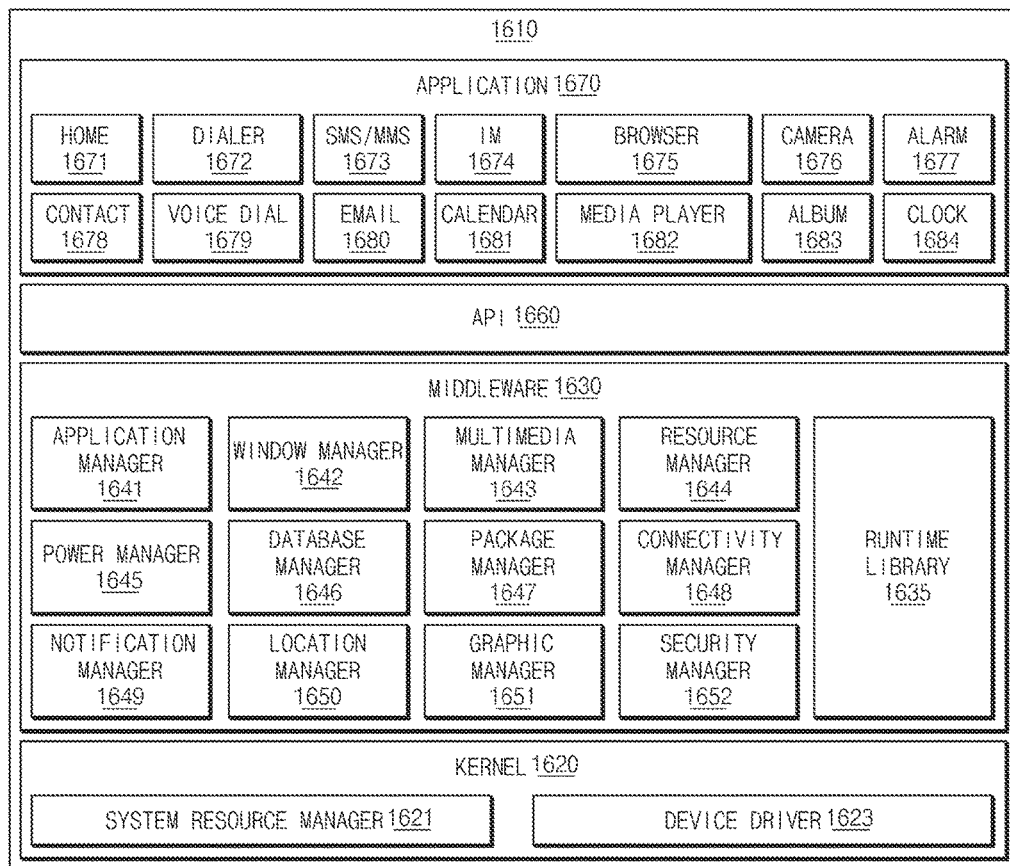
FIG. 16 is a block diagram illustrating a program module according to an embodiment of the present disclosure.

FIG. 16 is a block diagram illustrating a program module according to various embodiments of the present disclosure.

Referring to FIG. 16, according to an embodiment of the present disclosure, a program module 1610 (for example, the program 1440) may include an operating system (OS) for controlling a resource relating to an electronic device (for example, the electronic device 1401) and/or various applications (for example, the application program 1447) running on the OS. The OS, for example, may include android, iOS, windows, symbian, tizen, or bada.

The program module 1610 may include a kernel 1620, a middleware 1630, an API 1660, and/or an application 1670. At least part of the program module 1610 may be preloaded on an electronic device or may be downloaded from an external electronic device (for example, the electronic device 1402 or 1404 or the server device 1406).

The kernel 1620 (for example, the kernel 1441), for example, may include a system resource manager 1621, or a device driver 1623. The system resource manager 1621 may perform the control, allocation, or retrieval of a system resource. According to an embodiment of the disclosure, the system resource manager 1621 may include a process management unit, a memory management unit, or a file system management unit. The device driver 1623, for example, may include a display driver, a camera driver, a BT driver, a sharing memory driver, a USB driver, a keypad driver, a Wi-Fi driver, an audio driver, or an inter-process communication (IPC) driver.

The middleware 1630, for example, may provide a function that the application 1670 requires commonly, or may provide various functions to the application 1670 through the API 1660 in order to allow the application 1670 to efficiently use a limited system resource inside the electronic device. According to an embodiment of the disclosure, the middleware 1630 (for example, the middleware 1443) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, and a security manager 1652.

The runtime library 1635, for example, may include a library module that a complier uses to add a new function through a programming language while the application 1670 is running. The runtime library 1635 may perform a function on input/output management, memory management, or an arithmetic function.

The application manager 1641, for example, may mange the life cycle of at least one application among the applications 1670. The window manager 1642 may manage a GUI resource used in a screen. The multimedia manager 1643 may recognize a format for playing various media files and may encode or decode a media file by using the codec corresponding to a corresponding format. The resource manager 1644 may manage a resource such as a source code, a memory, or a storage space of at least any one of the applications 1670.

The power manager 1645, for example, may operate together with a basic input/output system (BIOS) to manage the battery or power and may provide power information necessary for an operation of the electronic device. The database manager 1646 may create, search, or modify a database used in at least one application among the applications 1670. The package manager 1647 may manage the installation or update of an application distributed in a package file format.

The connectivity manger 1648 may manage a wireless connection such as or Bluetooth (BT). The notification manager 1649 may display or notify an event such as arrival messages, appointments, and proximity alerts to a user in a manner of not interrupting the user. The location manager 1650 may manage location information on an electronic device. The graphic manager 1651 may manage a graphic effect to be provided to a user or a user interface relating thereto. The security manager 1652 may provide various security functions necessary for system security or user authentication. According to an embodiment, when an electronic device (for example, the electronic device 1401) includes a phone function, the middleware 1630 may further include a telephony manager for managing a voice or video call function of the electronic device.

The middleware 1630 may include a middleware module for forming a combination of various functions of the above-mentioned components. The middleware 1630 may provide a module specialized for each type of OS to provide differentiated functions. Additionally, the middleware 1630 may delete part of existing components or add new components dynamically.

The API 1660 (for example, the API 1445, and for example, as a set of API programming functions), may be provided as another configuration according to OS. For example, in the case of android or iOS, one API set may be provided for each platform and in the case Tizen, at least two API sets may be provided for each platform.

The application 1670 (for example, the application program 1447) may include at least one application for providing functions such as a home 1671, a dialer 1672, an short message service (SMS)/multi-media message service (MMS) 1673, an instant message 1674, a browser 1675, a camera 1676, an alarm 1677, a contact 1678, a voice dial 1679, an e-mail 1680, a calendar 1681, a media player 1682, an album 1683, a clock 1684, health care (for example, measurement of an exercise amount or blood sugar), or environmental information provision (for example, provide air pressure, humidity, or temperature information).

According to an embodiment, the application 1670 may include an application (hereinafter referred to as "information exchange application") for supporting information exchange between the electronic device (for example, the electronic device 1401) and an external electronic device (for example, the electronic devices 1402 and 1404). The information exchange application, for example, may include a notification relay application for relaying specific information to the external device or a device management application for managing the external electronic device.

For example, the notification relay application may have a function for relaying to an external electronic device (for example, electronic device 1402 or 1404) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 1402 and 1404) communicating with the electronic device, an application operating in the external electronic device, or a service (for example, call service or message service) provided from the external device.

According to an embodiment of the disclosure, the application 1670 may include a specified application (for example, a health care application of a mobile medical device) according to the property of an external electronic device (for example, the electronic device 1402 or 1404). According to an embodiment, the application 1670 may include an application received from an external electronic device (for example, the server 1406 or the electronic device 1402 or 1404). According to an embodiment of the disclosure, the application 1670 may include a preloaded application or a third party application downloadable from a server. The names of components in the program module 1610 according to the shown embodiment may vary depending on the type of OS.

According to various embodiments of the present disclosure, at least part of the program module 1610 may be implemented with software, firmware, hardware, or a combination thereof. At least part of the program module 1610, for example, may be implemented (for example, executed) by a processor (for example, the processor 1510). At least part of the program module 1610 may include a module, a program, a routine, sets of instructions, or a process to perform at least one function, for example.

According to embodiments disclosed in this specification, an appropriate workout route selection may be possible based on a user's profile such as a user's workout purpose or workout level. Additionally, even with the same workout route, a section may be analyzed differently according to a user's profile and guide may be provided differently.

Additionally, according to an embodiment of the present disclosure, a user may perform a workout by analyzing another user's workout record based on the user's profile, and share the user's workout record with another user.

Besides that, various effects identified directly or indirectly through this specification may be provided.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A. "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 1420) executes an instruction, it may perform a function corresponding to the instruction. The non-transitory computer-readable storage media may include the memory 1430, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   at least one sensor configured to sense at least one of a location of the electronic device or an elevation of the electronic device;
   a memory configured to:
      store workout route data including location data and elevation data, and
      store a user profile including user's workout level; and
   at least one processor communicatively coupled to the memory and configured to:
      determine a workout route including a first section which is flat, a second section which has slope with a first range degree, and a third section which has a slope with a second range degree higher than the first range degree based on the workout route data and the user's workout level included in the user profile, and
      present, on the display, a map for displaying the workout route,
   wherein the first section is determined as a flat section and the second section and the third section are determined as uphill sections, in response to the user's workout level is a first level, and
   wherein the first section and the second section are determined as flat sections and the third section are determined as an uphill section, in response to the user's workout level is a second level higher than the first level.

2. The electronic device of claim 1, wherein the uphill sections and the downhill sections are displayed in forms different from each other.

3. The electronic device of claim 1, wherein the uphill sections are each configured to:
include a slope value, and
be displayed in a different form according to the slope value.

4. The electronic device of claim 1,
wherein the workout route includes a plurality of sections including the first section, the second section, and the third section, and
wherein the at least one processor is further configured to determine a section from the plurality of sections included the workout route as a target section.

5. The electronic device of claim 4, wherein the at least one processor is further configured to determine the target section based on a user input.

6. The electronic device of claim 4, wherein the at least one processor is further configured to provide a guide for the target section.

7. The electronic device of claim 6, wherein the guide comprises at least one of a guide for the target section entry time point, a guide for a feature of the target section, a guide for a time consumed when passing the target section, or a guide for the target section passing time point.

8. The electronic device of claim 7, wherein the feature of the target section comprises a slope degree of the target section.

9. The electronic device of claim 1, further comprising:
a global positioning system (GPS) configured to obtain current location information of the electronic device,
wherein the at least one processor is further configured to provide a guide based on the current location and the workout route.

10. The electronic device of claim 9, wherein the guide is further configured to include at least one of a guide for representing route deviation or a route feature.

11. The electronic device of claim 9, wherein the at least one processor is further configured to:
determine at least one of a workout duration time, a workout distance, an average speed, a maximum speed, a current speed, or a current location, and
provide a guide based on the determination result.

12. The electronic device of claim 1, further comprising:
a transceiver configured to obtain the workout route data from a server or an external device.

13. A method for providing a workout guide of an electronic device, the method comprising:
sensing, by at least one sensor, at least one of a location of the electronic device or an elevation of the electronic device;
obtaining, from a memory, workout route data including location data and elevation data, and a user profile including user's workout level;
determining, by at least one processor, a workout route including a first section which is flat, a second section which has slope with a first range degree, and a third section which has a slope with a second range degree higher than the first range degree based on the workout route data and the user's workout level included in the user profile; and
presenting, by the at least one processor, a map for displaying the workout route,
wherein the first section is determined as a flat section and the second section and the third section are determined as uphill sections, in response to the user's workout level is a first level, and
wherein the first section and the second section are determined as flat sections and the third section are determined as an uphill section, in response to the user's workout level is a second level higher than the first level.

14. The method of claim 13, further comprising:
determining a highlight section based on a specified condition.

15. The method of claim 14, wherein the specified condition corresponds to at least one of calorie consumption, a traveling time, an elevation change, or a traveling distance.

16. The method of claim 13, wherein the presenting of the map to the display comprises displaying the uphill section and the downhill section in forms different from each other.

17. The method of claim 13, further comprising:
outputting the user's current location on the map.

18. The method of claim 13, further comprising:
outputting the user's current workout state to the display.

19. The method of claim 13, further comprising:
providing a workout guide based on the workout path and the user's current workout state.

20. An electronic device comprising:
a display;
at least one sensor configured to sense at least one of a location of the electronic device or an elevation of the electronic device;
a memory configured to:
store workout route data including location data and elevation data, and
store a user profile including user's workout level; and
at least one processor communicatively coupled to the memory and configured to:
determine a workout route including sections based on the workout route data including the location data and the elevation data,
present, on the display, a map for the workout route including the sections, the sections comprising at least one slope section and at least one non-slope section,
determine a first section included in the sections as one of the at least one slope section in response to the user's workout level being a first level, and
determine the first section included in the sections as one of the at least non-slope section in response to the user's workout level being a second level higher than the first level,
wherein the at least one slope section and the at least one non-slope sections are differently presented on the map.

* * * * *